US007966025B1

(12) United States Patent
O'Neil

(10) Patent No.: US 7,966,025 B1
(45) Date of Patent: *Jun. 21, 2011

(54) MODIFICATION OF PORTABLE COMMUNICATIONS DEVICE OPERATION IN VEHICLES

(75) Inventor: Joseph Thomas O'Neil, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,743

(22) Filed: Dec. 7, 2010

Related U.S. Application Data

(63) Continuation of application No. 12/009,738, filed on Jan. 22, 2008, now Pat. No. 7,873,374, which is a continuation of application No. 11/216,824, filed on Aug. 31, 2005, now Pat. No. 7,343,148, which is a continuation of application No. 09/832,066, filed on Apr. 10, 2001, now Pat. No. 6,973,333.

(51) Int. Cl.
*H04W 24/00* (2009.01)
(52) U.S. Cl. ............... 455/456.4; 455/456.1; 455/404.2; 455/410; 455/420; 455/569.2
(58) Field of Classification Search .... 455/456.1–456.6, 455/404.1–404.2, 569.1–569.2, 575.9, 418–420, 455/90.3
See application file for complete search history.

(56) References Cited

U.S. PATENT DOCUMENTS

| | | | |
|---|---|---|---|
| 3,784,769 A | 1/1974 | Bryll | |
| 3,940,581 A | 2/1976 | Door | |
| 3,946,178 A | 3/1976 | Eberle et al. | |
| 4,655,313 A | 4/1987 | Hicks | |
| 5,177,685 A * | 1/1993 | Davis et al. | 455/456.5 |
| 5,235,633 A | 8/1993 | Dennison et al. | |
| 5,442,805 A | 8/1995 | Sagers et al. | |
| 5,642,398 A | 6/1997 | Tiedemann, Jr. et al. | |
| 5,778,304 A | 7/1998 | Grube et al. | |
| 5,810,392 A | 9/1998 | Gagnon | |
| 5,826,195 A | 10/1998 | Westerlage et al. | |
| 5,884,193 A | 3/1999 | Kaplan | |
| 5,890,068 A | 3/1999 | Fattouche et al. | |
| 5,991,676 A | 11/1999 | Podoloff et al. | |
| 6,011,973 A | 1/2000 | Valentine et al. | |
| 6,064,722 A | 5/2000 | Clise et al. | |
| 6,073,013 A | 6/2000 | Agre et al. | |
| 6,201,973 B1 | 3/2001 | Kowaguchi | |
| 6,230,017 B1 | 5/2001 | Andersson et al. | |
| 6,256,503 B1 | 7/2001 | Stephens | |
| 6,470,447 B1 | 10/2002 | Lambert et al. | |

(Continued)

OTHER PUBLICATIONS

EA. Bretz, "X marks the spot, maybe," IEEE Spectrum, Apr. 2000, pp. 26-36.

(Continued)

*Primary Examiner* — Sharad Rampuria

(57) ABSTRACT

Restrictions on use of a cellular telephone in a vehicle, such as an automobile, are imposed using a global position system (GPS) device to determine the location of a vehicle in relation to geographic regions in which legal or customer restrictions on cellular telephone use are to be imposed. Network or local short-range wireless transmitters supply information to a cellular telephone describing potentially applicable restriction information retrieved from network databases. In response, a cellular telephone determines applicability of such restrictions and applies them to further use of the cellular telephone while such restrictions continue to apply. Alternative arrangements allow vehicle-based or network based processing of region and restrictions information to yield command messages to cellular telephones to control their further use.

20 Claims, 19 Drawing Sheets

U.S. PATENT DOCUMENTS

| | | | |
|---|---|---|---|
| 6,496,703 B1 | 12/2002 | da Silva | |
| 6,496,709 B2 | 12/2002 | Murray | |
| 6,556,810 B2 | 4/2003 | Suzuki | |
| 6,580,916 B1 | 6/2003 | Weisshaar et al. | |
| 6,690,940 B1 | 2/2004 | Brown et al. | |
| 6,721,542 B1 | 4/2004 | Anttila et al. | |
| 6,778,818 B1 | 8/2004 | O'Neil | |
| 6,816,731 B1 | 11/2004 | Maruyama | |
| 6,832,093 B1 | 12/2004 | Ranta | |
| 6,934,509 B1 | 8/2005 | Shimazu | |
| 6,973,333 B1* | 12/2005 | O'Neil | 455/569.2 |
| 7,058,358 B2 | 6/2006 | Cannon et al. | |
| 7,257,426 B1 | 8/2007 | Witkowski et al. | |
| 7,343,148 B1* | 3/2008 | O'Neil | 455/404.2 |
| 7,486,943 B2 | 2/2009 | Choti et al. | |
| 7,502,619 B1* | 3/2009 | Katz | 455/456.5 |
| 7,689,231 B2 | 3/2010 | Mardiks et al. | |
| 7,724,128 B2 | 5/2010 | Shimizu | |
| 7,734,315 B2 | 6/2010 | Rathus et al. | |
| 7,874,005 B2* | 1/2011 | Picolli | 726/26 |
| 2001/0031631 A1 | 10/2001 | Pitts | |
| 2002/0053028 A1* | 5/2002 | Davis | 713/200 |
| 2002/0107032 A1 | 8/2002 | Agness et al. | |
| 2004/0033795 A1 | 2/2004 | Walsh et al. | |
| 2004/0204187 A1* | 10/2004 | Nevermann | 455/575.1 |
| 2005/0068169 A1 | 3/2005 | Copley et al. | |
| 2007/0072623 A1* | 3/2007 | Shyr et al. | 455/456.1 |
| 2007/0117572 A1* | 5/2007 | Adam et al. | 455/456.1 |
| 2007/0287473 A1* | 12/2007 | Dupray | 455/456.1 |
| 2008/0052528 A1* | 2/2008 | Poo et al. | 713/186 |
| 2008/0194269 A1* | 8/2008 | Abernethy et al. | 455/456.1 |
| 2008/0214211 A1 | 9/2008 | Lipovski | |
| 2009/0111422 A1 | 4/2009 | Bremer et al. | |
| 2010/0227629 A1 | 9/2010 | Cook et al. | |
| 2011/0009107 A1* | 1/2011 | Guba et al. | 455/418 |

OTHER PUBLICATIONS

H. Koshima, et al, "Personal locater services emerge," IEEE Spectrum, Feb. 2000, pp. 41-48.

"Getting Started with MapInfo," (pamphlet), MapInfo Corp., 2000, available at www.mapinfo.com, 12 pages.

"MapInfo Unveils PSAP Pro to Accurately Locate Mobile Callers and Reduce 911 Response Time," (Press Release), MapInfo Corp., available at http://dynamo.mapinfo.com/presscenter/web/view.cfm?releaseid=595, 2 pages.

E. Schwartz, "E-cars take to the streets: wireless connections to link road warriors to 'Net," NetworkWorldFusion, Dec. 10, 2000, available at www.nwfusion.com/cgi-bin/mailto/x.cgi, 3 pp.

M. Johnston, "Start-up to integrate Palm in car," NetworkWorldFusion, Dec. 10, 2000, available at www.nwfusion.com/cgi-bin/mailto/x.cgi, 2 pp.

R. Perera, "Companies unveil automotive software products," NetworkWorldFusion, Dec. 10, 2000, available at www.nwfusion.com/cgi-bin/mailto/x.cgi, 1 page.

Toshiba Bluetooth PC Card, Toshiba Corp., available at www.csd.toshiba.com, Jan. 25, 2000, 1 page.

L. Guernsey, "Taking the Offensive Against Cell Phones," New York Times, Jan. 11, 2001, available at www.nytimes.com2001/01/11/technology/11JAMS.html?printpage=yes. 5 pp.. and in newspaper at p. G1, reprinted on 3 pp.

"DelphiAttacks Car-Phone Safety Issue," informationweek.com, Jan. 15, 2001, 1 page.

M.J. Patterson, "Cell phone regulations: More talk than action," The Star Ledger, Jan. 22, 2001, pp. 11 and 15, preprinted as 1 page.

* cited by examiner

*FIG. 5*

REGION TABLE

| REGION ID | BOUNDARY POINTS |
|---|---|
| 3204 | LATITUDE1, LONGITUDE1, LATITUDE2, LONGITUDE2, LATITUDE3, LONGITUDE3 |
| ----- | ----- |

*FIG. 6*

LEGAL RESTRICTIONS TABLE

| REGION ID | RESTRICTION TYPES | SPEED THRESHOLD (km/kh) |
|---|---|---|
| 3204 | 3 | 20 |
| 3204 | 4 | 20 |
| 3204 | 1 | 20 |
| 3204 | 2 | 30 |
| ----- | ----- | ----- |

*FIG. 7*

CUSTOMER RESTRICTIONS TABLE

| REGION ID | RESTRICTION TYPES | SPEED THRESHOLD (km/hr) |
|---|---|---|
| 0 | 3 | 0 |
| 0 | 4 | 0 |
| 0 | 1 | 20 |
| 0 | 2 | 30 |
| ----- | ----- | ----- |

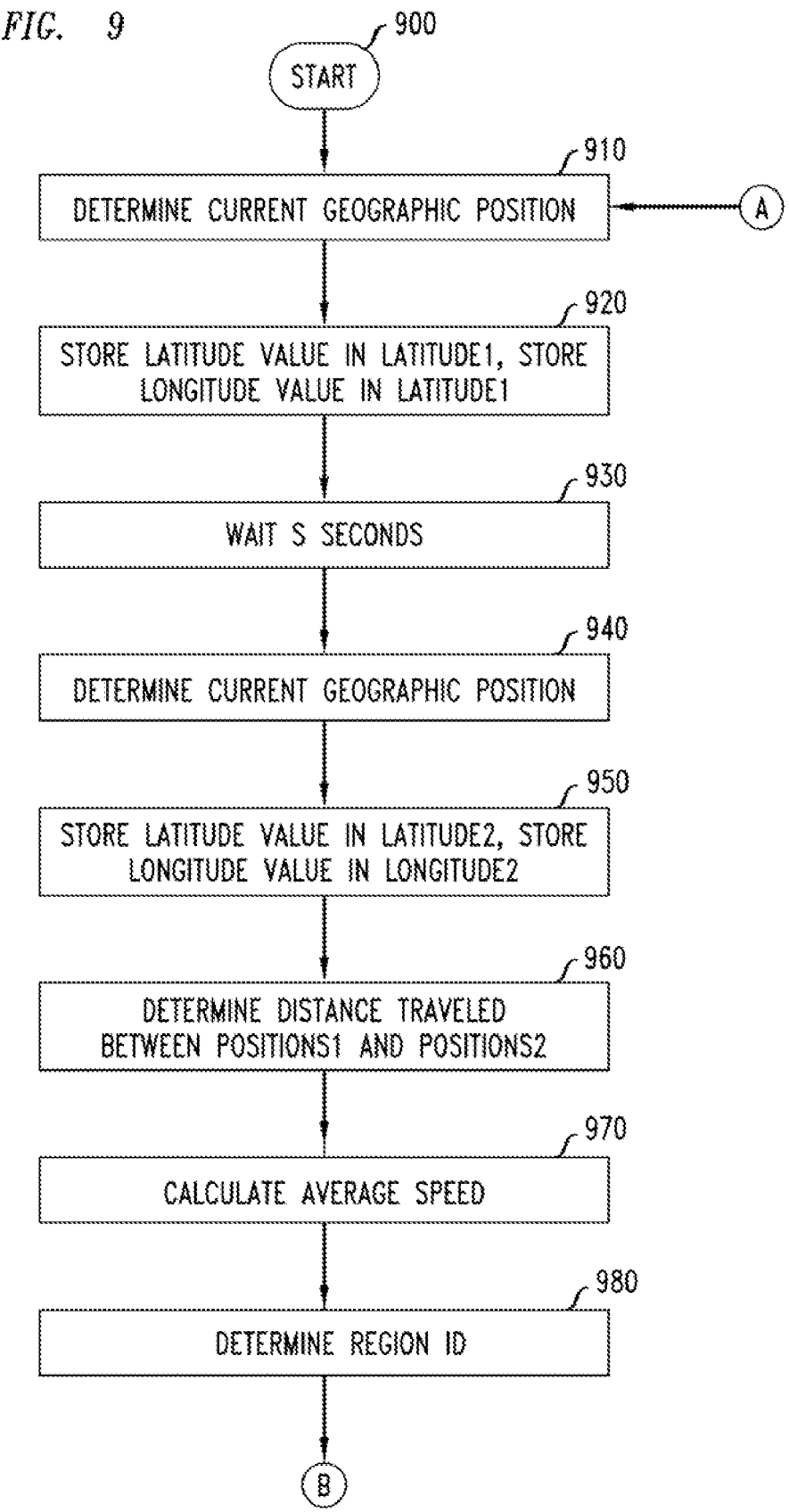

MODIFICATION OF PORTABLE COMMUNICATIONS DEVICE OPERATION IN VEHICLES

RELATED APPLICATIONS

This application is a continuation of application Ser. No. 12/009,738, entitled "Modification of Portable Communications Device Operation in Vehicles," filed Jan. 22, 2008, which issued on Jan. 18, 2011 as U.S. Pat. No. 7,873,374, which is a continuation of application Ser. No. 11/216,824, entitled "Modification of Portable Communications Device Operation in Vehicles," filed Aug. 31, 2005, which issued on Mar. 11, 2008 as U.S. Pat. No. 7,343,148, which is a continuation of application Ser. No. 09/832,066, entitled "Modification of Portable Communications Device Operation in Vehicles," filed Apr. 10, 2001, which issued on Dec. 6, 2005 as U.S. Pat. No. 6,973,333, which is related to the following non-provisional applications also filed on Apr. 10, 2001 by the present inventor:

(i) Modification of Portable Communications Device Operation in Identified Geographic Locations, and (ii) Use of Mobile Terminals to Monitor Vehicular Traffic, which non-provisional applications are assigned to the assignee of the present invention, and which non-provisional applications are hereby incorporated by reference into the present application as if set forth in their entirety herein.

FIELD OF THE INVENTION

The present invention relates to use of portable communications devices in vehicles. More particularly, the present invention relates to automatic modification of use of such portable communications devices in vehicles. Still more particularly, the present invention relates to modification of use under external control, including such controls as may be applied by a user, vehicle owner, or governmental or other authority.

BACKGROUND OF THE INVENTION

Recent years have witnessed explosive growth in the use of portable electronic devices, many of which include one or more types of voice and/or data communications capabilities. Perhaps the most visible examples of such devices are the virtually omnipresent cellular wireless telephones and personal communications devices. In the U.S. alone, approximately 100 million such devices are commonly in use. In addition, many pocket- or palm-sized devices originally directed to and used primarily for note-taking, personal information management, scheduling and similar activities have been augmented with wireless communications facilities for exchanging information—including exchanges over networks such as the Internet. In other aspects, portable communications devices now include laptop and other portable computers adapted to provide wireless voice and data communications access equivalent in most ways to computers having wired or optical network connections.

Though such widespread use of communications-enabled portable electronic devices has greatly expanded choice and efficiencies in personal and business contexts, such use has not been without some sacrifice in safety to users. In respect of wireless telephones, numerous examples have been reported of accidents occurring while users have been driving automobiles or other vehicles. The U.S. National Highway Traffic Safety Administration (NHTSA), in furtherance of its mission to seek ways to save lives and reduce economic and other traffic-related losses, has issued a report entitled An Investigation of the Safety Implications of Wireless Communications in Vehicles—available at http://www.nhtsa. dot.gov/people/injury/research/wireless/. As noted in the NHTSA report, there is a body of evidence supporting cellular telephone use as a growing factor in automobile crashes. (In a manner similar to usage in the cited NHTSA report, the term cellular telephone (or cellular phone) will be used to indicate not only now-traditional cellular telephones, but also others in the full range of portable electronic devices having communications or other functionality requiring user attention beyond passive listening.)

Because driving of automobiles while using cellular telephones and similar devices can require a level of skill and care not achievable under all driving circumstances, a number of governmental entities have enacted statutes or ordinances prohibiting or limiting use of cellular telephones by drivers. Conditions under which such restrictions on cellular telephone use apply can vary from one location to another, and may also include restrictions such as those based on time-of-day or day-of-week considerations.

While not the subject of governmental action, other restrictions on use of cellular telephones may be desired, e.g., by parents of teenage children with respect to times or places in which cellular phones may be used. Thus, a parent may deem it appropriate to limit use of a cellular phone by a teenage neophyte driver to reduce distractions from the driving task at hand. In addition, individuals seeking to fully comply with governmental or other restrictions may find it difficult to associate particular restrictions with specific locations, times or vehicle operational parameters.

Heretofore, enforcement of governmental or other restrictions on cellular telephone use has been difficult and lacking in uniformity. Indeed, efforts to promote safety in the use of cellular telephones has been largely limited to cautionary warnings and devising ways to reduce the distracting effects of dialing calls or otherwise manipulating electronic equipment controls. See, for example, "Delphi Attacks Car-Phone Safety Issue," Information Week, Jan. 15, 2001, p. 30, and "Cell phone regulations: More talk than action," The Star-Ledger, Jan. 22, 2001, p. 15.

Location-based controls, such as those using global positioning satellite (GPS) functionality, have previously been applied to aspects of vehicle operation, e.g., engine settings or the turning on of operating lights on a vehicle in accordance with changes in location. See, for example, U.S. Pat. No. 5,247,440 issued Sep. 21, 1993 to Capurka, et al. In a related manner, U.S. Pat. No. 5,223,844 issued Jun. 29, 1993 to Mansell discloses use of GPS-derived location information and vehicle status information in reporting to a centralized control center. See further, H. Koshima, et al, "Personal Locator Services Emerge," IEEE Spectrum, February, 2000, pp. 41-48; and E. A. Bretz, "X marks the spot, maybe," IEEE Spectrum, April, 2000, pp. 26-36.

One attempt at controlling cell phone use pursued by Bluelinx, Inc. applies a local fixed-position radio source (using well-known Bluetooth technologies) to adjust or switch off cell phones in a defined area. See further, http://www.bluelinx.com and "Taking the Offensive Against Cell Phones," The New York Times, Jan. 11, 2001, p. G1 and G7. The latter reference also describes efforts to discourage use of cell phones by employing local jamming techniques, even at the expense of restricting emergency service calling.

Such prior art location monitoring and control techniques have not readily permitted control of cell phone use for users in transit from place to place, nor has it provided desired flexibility in dealing with emergency conditions or in permitting use in accordance with a range of exceptions to otherwise applicable control regimes.

There exists a need, therefore, for flexible control mechanisms and processes for automatically restricting use of cellular telephones (and other electronic communications devices) in accordance with health, safety, or other management or governmental directives, or in accordance with user (or other) preferences.

SUMMARY OF THE INVENTION

Limitations of the prior art are overcome and a technical advance is achieved in accordance with the present invention, wherein location-determining devices are combined with wireless communications facilities to access database information regarding use of cellular telephones (cell phones) and related devices by individuals in vehicles, subject to desired or imposed conditions.

In accordance with an illustrative embodiment, the present invention employs a global position system (GPS) device to determine the location of a cellular telephone. Cellular communications links (not requiring human participation) then provides location information to a network location having connections to one or more databases describing geographic and/or temporal (or other) limitations on use of cellular telephones. Location-specific information regarding limitations on cellular telephone use is then returned to the target cellular telephone to control its use.

In typical operation, a hand-held cellular telephone for use in illustrative embodiments of the present invention includes both GPS and normal cellular telephone functionality. Also included in such a hand-held device is a controller for directing transmission and reception of information between the cellular telephone and one or more network-based databases and for enforcing restrictions relayed to the target cellular telephone. As will be appreciated, automatic determination of location and applicable local cell phone restrictions permits enforcement of these restrictions at a cellular telephone without active user participation.

Provision is also advantageously made to accommodate emergency or other special circumstances, such as initiating an emergency (e.g., 911) call, by permitting override of, or exceptions to, local restrictions, as appropriate in particular circumstances. In accordance with an optional feature, provision is made to accommodate relaxed restrictions that may apply under prescribed conditions, e.g., when more than one passenger is riding in a vehicle, or when a vehicle is stationary.

Alternative embodiments provide similar control of use of cellular phones (cell phones) using location, restriction and conditions/exemption information evaluated at a vehicle-based or network-based controller, with control messages forwarded to the cell phone for enforcement of use restrictions.

BRIEF DESCRIPTION OF THE DRAWING

The present invention will be more completely understood when read in conjunction with the attached drawing, wherein:

FIG. 5 shows an illustrative regions table for use in illustrative embodiments of the present invention.

FIG. 6 shows an illustrative legal restrictions table for use in illustrative embodiments of the present invention.

FIG. 7 shows an illustrative customer restrictions table for use in illustrative embodiments of the present invention.

FIG. 9 is a flowchart of an illustrative average speed determining routine useful in some embodiments of the present invention.

DETAILED DESCRIPTION

Figure 1:
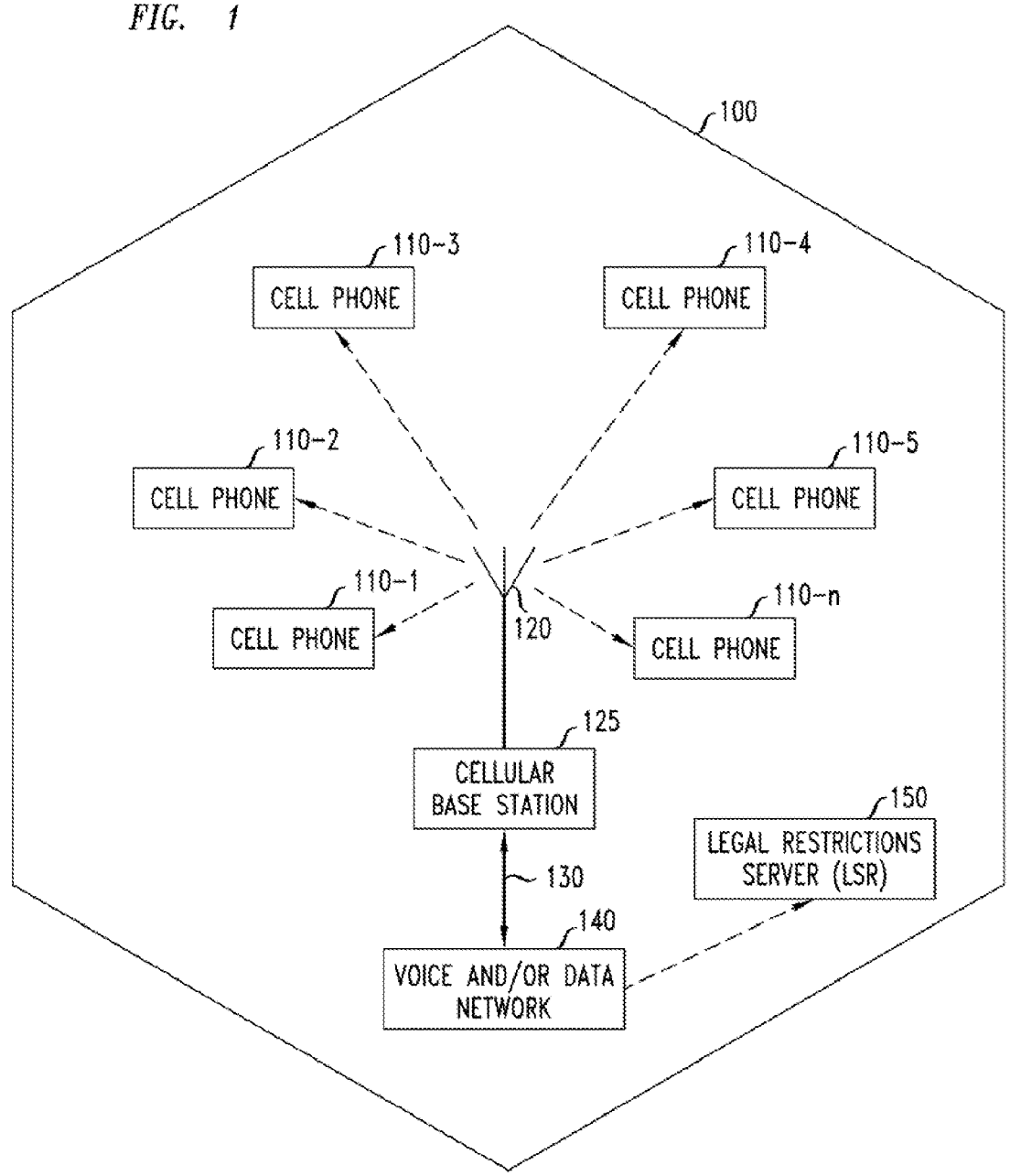
FIG. 1 shows an illustrative system arrangement for control of cellular telephone use in accordance with one aspect of the present invention.

FIG. 1 shows an illustrative system architecture for control of cellular telephone use within an operating space (illustratively, a cell) in accordance with aspects of the present invention. There, a representative wireless cell 100 is shown as including within its boundaries a plurality of cellular phones (cell phones), identified as 110-1 through 110-n. These cell phones communicate via antenna 120 in well-known fashion with cellular base station 125 or mobile telephone switching office (MTSO). While standard analog or digital cellular signals and protocols, or any of a variety of other mobile communications devices, signals and protocols may be used to communicate between cell phones 110-i and base station 125, the present description will illustratively proceed in terms of well-known TDMA or CDMA practice and procedures when any such election of formats and protocol may be necessary or appropriate.

Cell phones 110-i in FIG. 1 are advantageously augmented in accordance with an aspect of the present invention with global positioning system (GPS) receiving functionality for receiving one or a plurality of position-indicating signals from external sources, typically satellite sources well known in the art. Though standard GPS satellite signals, such as those employed in the widely used NAVSTAR system, are well adapted for use at a GPS receiver included in cell phones 110-i, local or regional terrestrial signals may be used in some applications of the present inventive techniques. Such terrestrial signals provide location information transmitted from fixed or identified locations to cell phone-based receivers.

Messages received at base station 125 from one or more cell phones are advantageously forwarded to a legal restrictions server (LRS) 150. LRS 150 is arranged to store information relating to restrictions on cellular telephone usage in cell 100 and/or other designated geographical area(s). Further, LRS 150 includes standard message handling facilities for delivering relevant information about such local restrictions to cell phones within respective designated geographic areas.

Access to LRS 150 may be by direct local connection or by land line (or wireless, including satellite) links to a remote server location. In some illustrative embodiments, messages received at base station 125 will be connected via a voice/data network 140 to LRS 150. Network 140 will, as particular application requirements may require, assume the form of the public switched telephone network (PSTN), the Internet, or more specialized voice and/or data networks. In a typical application, network 140 will be the PSTN and messages between LRS 150 and cell phones 110-*i* will be converted to/from signaling messages, such as Signaling System 7 (SS7) TCAP messages of a form well known in the network arts. Other particular messaging formats and protocols will be employed for all or some of the links between cell phones 110-*i* and LRS 150 when Internet Protocol (IP) or other data messages are employed. Messages between base station 125 and cell phones will, of course, be in whatever form is appropriate to the wireless link 120, base station 125 and the respective cell phones. In appropriate cases, wireless link 120 may include analog, personal communications system (PCS) or other digital formatted signals.

Based on messages including location and cell phone identification information, which messages are initiated by powered-up cell phones among the cell phones 110-*i*, and which messages are delivered to LRS 150, determinations are made as to restrictions to be imposed on use of the respective cell phones. Thus, if a determination that cell phone 110-4 is in a vehicle in a governmental jurisdiction that prohibits use of cell phones in vehicles, then one or more control messages are sent to cell phone 110-4 to render the cell phone inoperative. However, if cell phone 110-4 is identified in LRS 150 as being under the control of a police (or other safety or emergency agency), or if it is otherwise identified as exceptional under governing ordinances, then such control messages will be modified to permit the agency function to be performed using the cell phone. Other control aspects of determining status of a cell phone and in using a message control structure to effect desired controls will be discussed in the sequel.

Figure 2:
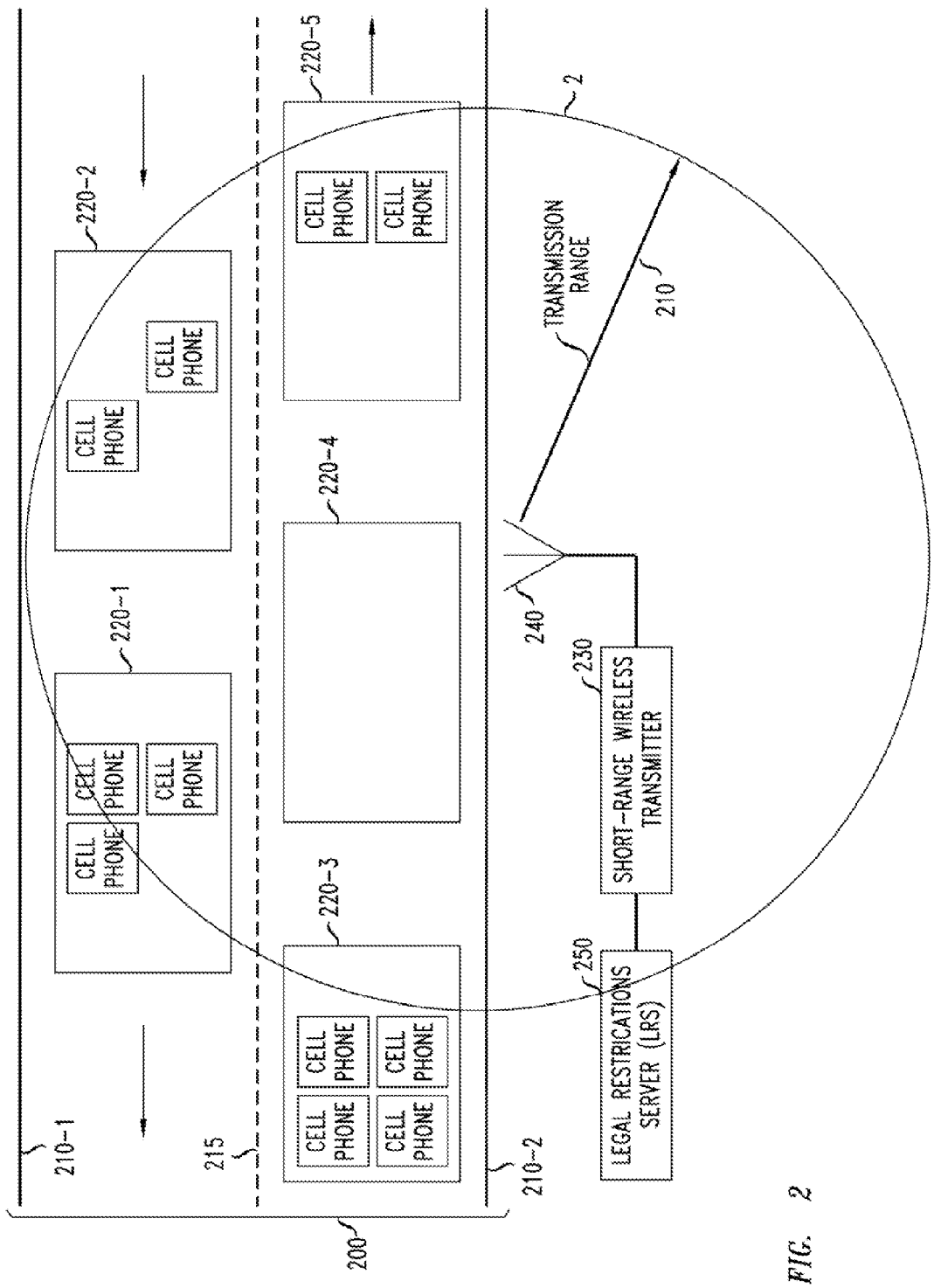
FIG. 2 illustrates one mode of operation of a link between automobile traffic on a roadway and a local-restrictions database (LRDB).

FIG. 2 shows an illustrative application of principles of the present invention employing local terrestrial signals from a short-range wireless transmitter 230 via antenna 240, which antenna is arranged to provide control signal propagation over a portion of a roadway 200 defined approximately by a radius from antenna 240 based on the transmission range transmitter 230. Vehicles 220-*i* moving to the left (such as 220-1 and 220-2) and to the right (such as 220-3 through 220-5) on roadway 200 are within the range of influence of transmitter 230. Messages based on restrictions applicable to vehicles in the range of transmitter 230 are received by powered-up cell phones in vehicles 220-*i*. Thus, restrictions articulated by LRS 250 are imposed by these messages on cell phones seeking to operate within the jurisdiction of the transmission range. Of course, the transmission range 210 need not be restricted to the dimensions suggested by FIG. 2, but may extend over a larger area. Applicability of restrictions for particular cell phones may be determined at LRS 250 using messages received from handshaking messages sent from powered-on cell phones and forwarded to LRS 250 using a network such as 140 in FIG. 1, or restrictions may be applicable to all non-exempt cell phones. In the latter circumstance, LRS will again determine which, if any, cell phones are exempt from some or all restrictions based on criteria known at LRS 250.

Figure 3:
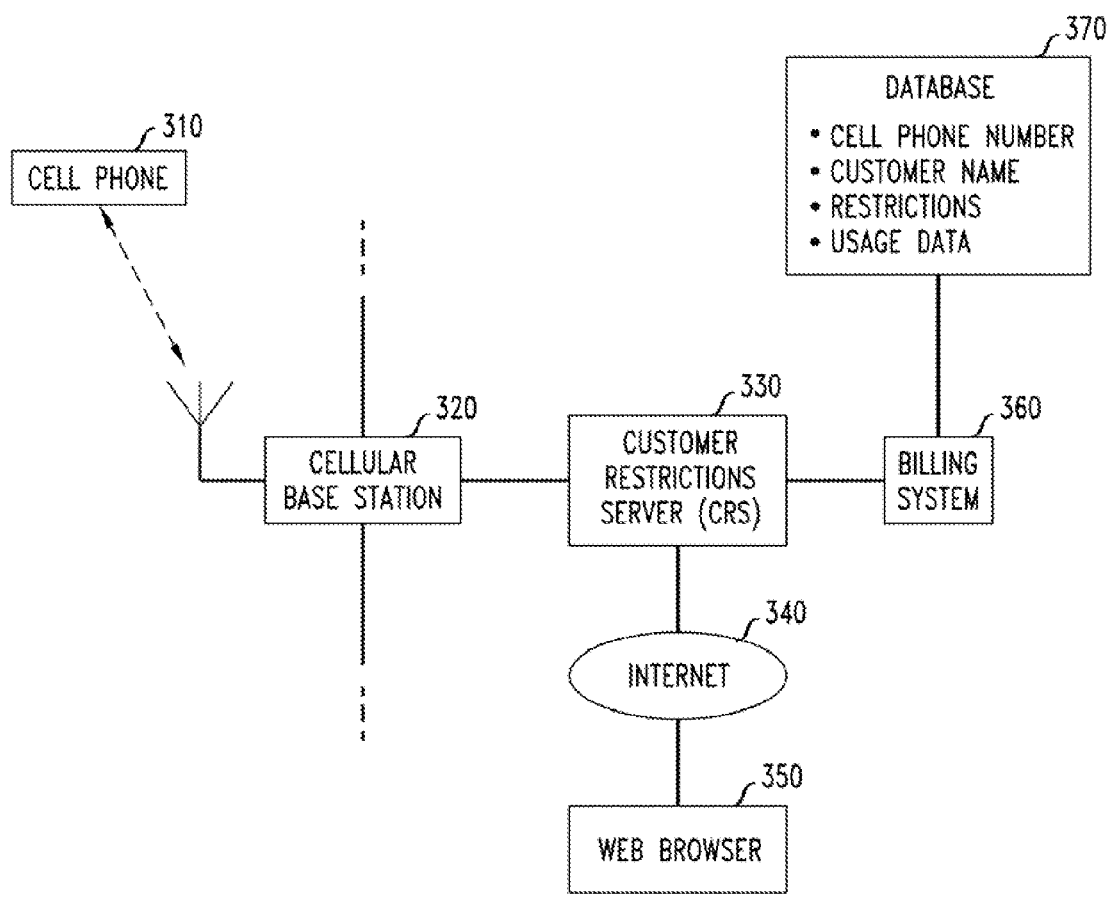
FIG. 3 shows another mode of illustrative system operation for effecting cell phone controls using a customer restriction server and aspects of a communications billing system.

FIG. 3 further illustrates the manner in which use restrictions may be imposed on cell phones, including location-aware cell phones, such as illustrative cell phone 310 in communication with cellular base station 320 (and from there to the PSTN and/or other wired or wireless networks). In particular, it proves convenient to provide control messages from customer restrictions server 330 to base station 320 to effect desired controls in the same manner as messages from LRS 250 in FIG. 2 and LRS 150 in FIG. 1. Server 330, in turn, is conditioned by messages from a control console or other system control terminal (illustratively represented by web browser 350) in FIG. 3. Messages from browser 350 are conveniently directed over a network, illustratively the Internet 340 or such other messaging network as may prove convenient.

In operation, the illustrative configuration shown in FIG. 3 is arranged to receive messages under the control of an operator or automatic provisioning system (or other control system) to direct CRS 330 to send appropriate control messages to respective cell phones, such as 310 in FIG. 3. CRS 330, in turn, receives information from billing system 360 regarding the state of the subscriber account associated with cell phone 310. Billing system 360 employs normal resources of billing systems, such as database facilities 370 for storing cell phone identification, customer identification, cell phone usage restrictions and cell phone usage data. Restrictions, or exceptions to restrictions, on cell phone usage associated with a particular subscriber account may be entered as part of the normal provisioning of subscriber service accounts, or may from time-to-time be modified or overridden by commands included in messages from system administrators, governmental authorities, or other authorized persons operating through web browser 350.

Any restrictions imposed on cell phones interacting with base station 320 may, of course, be location dependent. In particular, location information supplied by cell phones (using GPS or other location determinations) forwarded to base station 320 (and thence to CRS 330) may be applied as a condition on restrictions to be applied to particular cell phones. Thus, when a subscriber powers-on a cell phone in a locale where cell phone use is restricted, or where a cell phone is operated while entering such a locale, the location information supplied from the cell phone is advantageously used in determining the applicability of restrictions to the subject cell phone.

While system operator control (including normal provisioning and governmental directives) has been described as being a primary controlling factor in determining restrictions in the preceding illustrative network arrangements, it will be understood that, in appropriate cases, a subscriber (including a corporate or other group subscriber) may direct that cell phone use be restricted during operation of a vehicle. Thus, browser 350 may be operated under the control of the subscriber. Motivation for such restrictions as may originate with a subscriber will include an undertaking by the subscriber to obtain lower insurance rates for operated vehicles, or because of prior adverse experience with operation of motor vehicles in all or designated locations.

Figure 4:
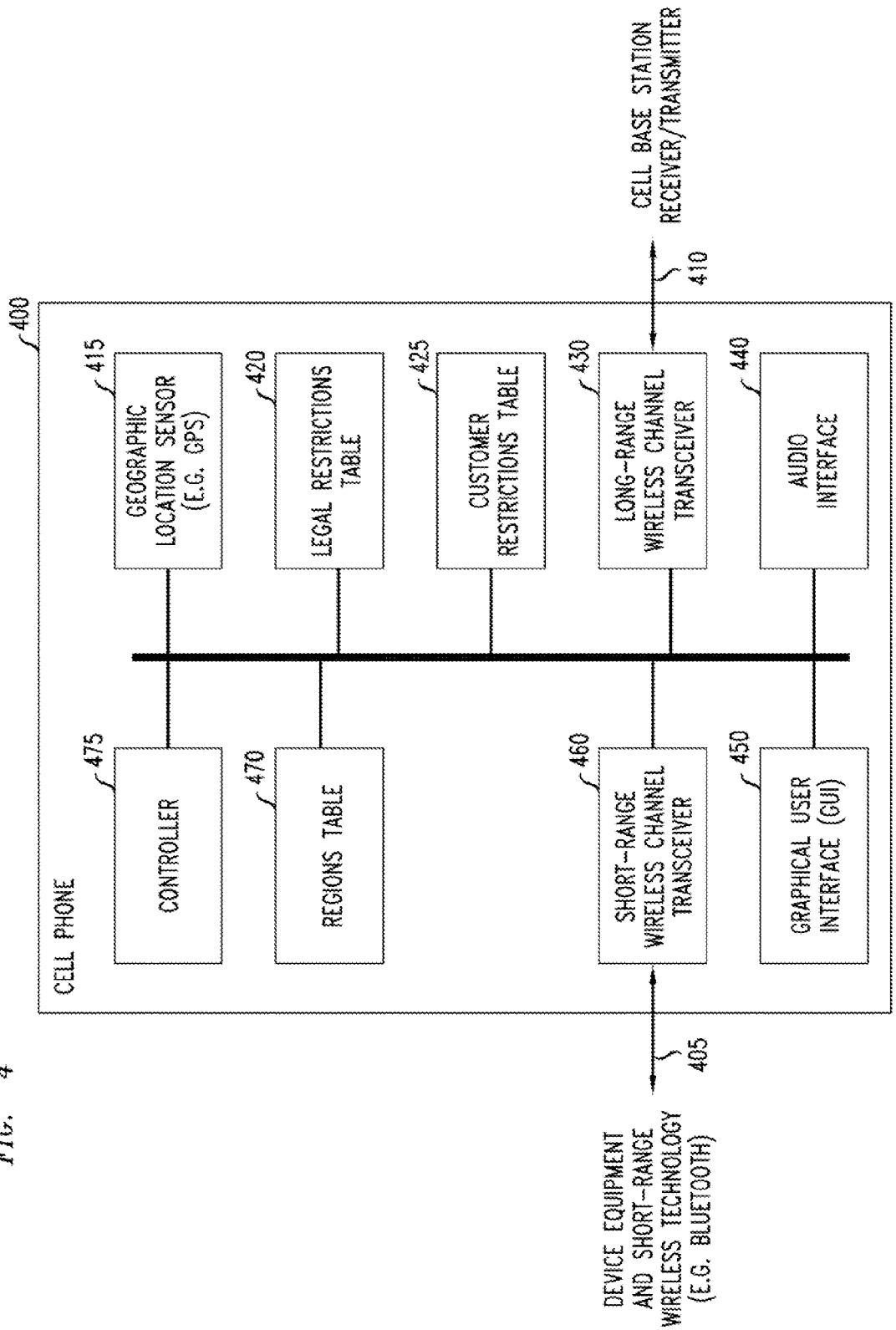
FIG. 4 shows an illustrative cell phone organization, including normal cell phone functionality as well as additional functional elements selectively employed in embodiments of the present invention.

FIG. 4 is a block diagram of an illustrative cell phone for use in illustrative embodiments of the present invention.

Shown there is a cell phone 400 communicating with a base station over link 410 using a so-called long-range wireless channel transceiver 430. Transmitter-receiver arrangement 430 is a traditional receiver-transmitter structure well known in the art tailored to the particular system structure and organization (e.g., CDMA, TDMA or other). Link 410 provides user voice and data communications information as well as control messages and downloaded table information to be described below.

The term "long-range" channel transceiver 430 is used to distinguish from transceiver 460 styled a "short-range" wireless channel transceiver. In practice, transceiver 460 is used to communicate over link 405 in exchanging information locally with a transceiver such as one adhering to the Bluetooth interface standard promulgated by the Bluetooth Special Interest Group (SIG). See generally, Miller, B. A, and C. Bisdikian, Bluetooth Revealed, Prentice-Hall, Inc., 2001; and the official Bluetooth Website at www.bluetooth.com. As noted there, Bluetooth radio functionality is advantageously built into a small microchip and operates in a globally available frequency band. Examples of Bluetooth-compatible products and development tools announced by vendors include those by Ericsson and Toshiba (such as Part #PA3053U-1PCC Bluetooth wireless PC card for personal computers).

Bluetooth or similar short-range transceivers 460 provide links to transmitters such as transmitter 230 in FIG. 2 described above, and to external sensors, data collectors and decision elements (including computers). As will be described below, it also proves advantageous to include short-range communications links between a cell phone of the type shown in FIG. 4 and local transceivers (or transmitters) in vehicles in which cell phone use is to be subject to control in accordance with present inventive teachings.

Block 440 in FIG. 4 represents the normal voice interface for user communications over a cellular or similar wireless network. Graphical user interface (GUI) 450 provides well-known graphical output to cell phone users. In appropriate cases, graphical input can likewise be provided in the manner of well-known hand-held personal digital assistants (PDIs) using a stylus or menu selections by hand or other pointing device.

Block 415 represents a geographic location sensor, such as a global positioning satellite (GPS) receiver. GPS receiver functionality has previously been combined with cell phone functionality in a single hand-held unit as described, for example, in U.S. Pat. No. 6,128,515, issued Oct. 3, 2000 to Kabler, et al. Such combination described in the last-cited patent to Kabler, et al is not directed to control of cell phone use in accordance with present inventive principles. Blocks 425, 420 and 470 represent storage for tabular or otherwise structured information representing user or customer (e.g., subscriber) restrictions, legal restrictions, and region definitions, respectively. Other particular control information reflecting other requirements, preferences, constraints or conditions for use of cell phone 400 will, of course, occur to those skilled in the art to meet particular location (including altitude or spatial), temporal or other requirements. Thus, blocks 425, 420 and 470 (and corresponding tables or other data structures) are merely illustrative. It proves advantageous to have storage and corresponding data structures represented by blocks 425, 420 and 470 populated by data stored in accordance with user preferences upon subscription or initial account provisioning, or as received over channels 405 and 410 in the course of use and relocation of cell phone 400.

Controller block 475 represents system control for the functional blocks shown in the illustrative cell phone of FIG. 4. Controller 475 will, as is typical of many such systems, include a processor and memory for storing control routines and data. Such control routines are advantageously programmable by user or system input to expand, and otherwise alter operation of cell phone 400 as required or desired by user or wireless system operators, or as a result of new or replacement laws, regulations or other constraints on cell phone use. Other functional units shown in FIG. 4 may include separate processors and memory, or one or more such functional units may share processors with each other or with controller 475.

FIGS. 5, 6 and 7 show illustrative data entries and table formats for contents of memory represented by blocks 425, 420 and 470 shown in FIG. 4.

In particular, FIG. 5 illustrates one format and illustrative region information. A region is a geographic area in which particular rules relating to restrictions on cell-phone use apply. In FIG. 5, the geographic regions are conveniently defined in terms of a 6-tuple of latitude and longitude coordinates (i.e., three coordinate pairs) in the right-hand column. Each region is identified in the left-hand column by a Region ID associated with the associated three-coordinate (triangular) boundaries of a region. While only one region is shown explicitly, it will be understood that many such regions will typically be defined by respective sets of coordinates. The illustrative format is consistent with the International Standards Organization (ISO) document 6709 Information Processing—Representation of Latitude and Longitude. See further, http://www.iso.ch for more details.

While the particular triangular regions used by way of example prove convenient in many contexts, no such geometrical limitation is inherent in application of present inventive teachings. Thus, in particular cases it may prove convenient to employ rectangular, hexagonal, or other readily defined geographic regions. The shape and size of regions will vary from one application to another, as well as from one location to another, and need have no necessary relationship to cell phone cell boundaries (or micro cell boundaries in other wireless organizations). In particular cases, one or more regions will correspond to a municipality, state or other governmental entity.

Some regions may be localized to a school zone or other area in which exceptional care is required while driving. If regions are not mutually exclusive, and if a high-restriction region, such as a school zone, is included in a larger region, such as a moderate-restriction municipality, then it proves appropriate in most cases to test for conditions applicable to the use of a cell-phone in a vehicle in all applicable regions. This may include, e.g., a state-wide region, a municipal region and a school zone region. The restrictions of the region having the most stringent restrictions will usually then be applied.

Other techniques for defining boundaries and locating cell phone users may also be used in connection with embodiments of the present invention. Thus, for example, location information available from MapInfo Corporation that is used for locating callers (including wireless callers) to emergency telephone numbers (such as 911) may be employed in appropriate cases.

As noted above, it proves advantageous to store region information in tables or other data structures in a cell phone for use in embodiments of the present information. To avoid the need for irrelevant region information, it proves convenient upon powering on a cell phone or upon passing from one cell (or other wireless area) to receive new or updated region boundary information for those regions that are likely to be of current interest from base stations acknowledging the presence of a cell phone. In the case of cell phones interacting over a link such as 410 in FIG. 4 with a base station, such downloaded information may wholly or partially overwrite or augment information previously stored in a regions table or the like shown in FIG. 4 as 470. In other cases, it proves convenient to have such region information downloaded (e.g., over links such as 405 in FIG. 4) from short-range wireless transmitters associated with an area in which a cell phone is currently present.

In similar manner, Legal Restrictions Table 420 or other appropriate data structure stores information relating to legal restrictions on cell phone use in particular geographical regions, subject to conditions appropriate to particular circumstances, as illustrated in FIG. 6. That figure shows a tabular format with three columns: Region ID, Restriction Type, and (illustratively) Speed Threshold. As in illustrative region table shown in FIG. 5, a region is conveniently referred to in terms of an integer Region ID, as are Restriction Types. Exemplary restriction types are assigned illustrative integer values and corresponding restrictions illustratively assume numerical values, as:

Type 1—Provide periodic warning signals (e.g., a tone or multi-tone signal generated by controller 475 and supplied to audio interface 440) when a prescribed threshold speed value is exceeded. For the example of region 3204 and for restriction type 1, the threshold speed is 20 km/hr.

Type 2—Provide notification and terminate an active call. Again, an illustrative threshold speed (30 km/hr) is given as a condition in FIG. 6; when this speed threshold is exceeded controller 475 advises the cell phone user that cell phone use is restricted under present circumstances and that the call is about to be terminated; the call is then automatically terminated.

Type 3—Block call origination with or without audio announcement. When a user attempts to place a call during a period when restrictions apply, controller 475 in FIG. 4 provides an audio tone or recorded announcement.

Type 4—Block call reception without notice. Calls to the target user will be treated in the same manner as when the cell phone is not powered on. Thus, calls may simply not be answered, or sent to a voice message recorder or be otherwise redirected.

FIG. 7 shows an illustrative customer restrictions table, which is similar in format to legal restrictions table shown in FIG. 6. Again, the format and particular restrictions and conditions will vary from customer to customer, and also may vary from one time to another, as customer's preferences may dictate. The entries in the table of FIG. 7 need not differ in kind from those in the legal restrictions table of FIG. 6, but the source of the restrictions is the cell phone customer, typically the actual user of the cell phone.

Customer inputs may reflect many of the same concerns as those to which legal restrictions are addressed, i.e., speed, proximity to school zones, hazardous weather conditions and the like, but may be more restrictive than legal restrictions generally applicable to all. In addition, customer restrictions may act as a reminder to a customer of conditions that may apply with particular force to certain users of a cell phone. Thus, for example, when a late hour or low light conditions cause driving to be especially challenging for a particular subscriber, restrictions imposed by that customer serve as a reminder (when cell phone use is restricted) that extra care may be required.

In other cases, a customer may wish to apply such higher restrictions on teenage or beginning drivers who have yet to develop the necessary skills to use cell phones when driving under conditions appropriate for more experienced drivers. Employer-customers may seek to encourage safe driving practices by controlling use of cell phones by employees while in vehicles. Particular customer-defined restrictions on cell phone use may prove attractive by making such customers eligible for reduced vehicle insurance rates.

As with legal restrictions, customer-defined restrictions are advantageously downloaded over short-range link 405 or long-range link 410 during active calling or power-on conditions. Such customer restrictions are not, however, broadcast to all active users in a region or cell (or microcell, etc.) or all active users in a set of regions in the vicinity of a cell, but rather are communicated only to the customer setting restrictions on the use of his/her cell phone.

Figure 8A:
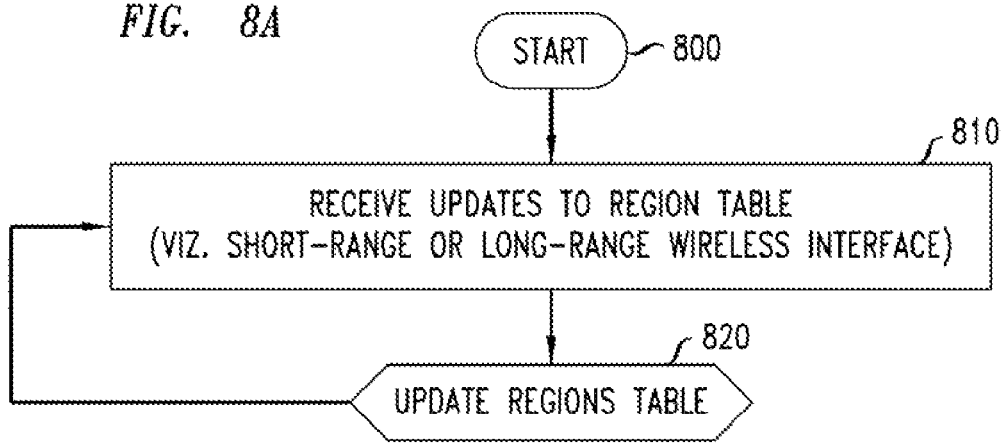
FIGS. 8A-C show flowcharts for illustrative update procedures to regions, legal restrictions and customer restrictions tables of the type shown in FIGS. 5, 6 and 7, respectively.
Figure 8B:
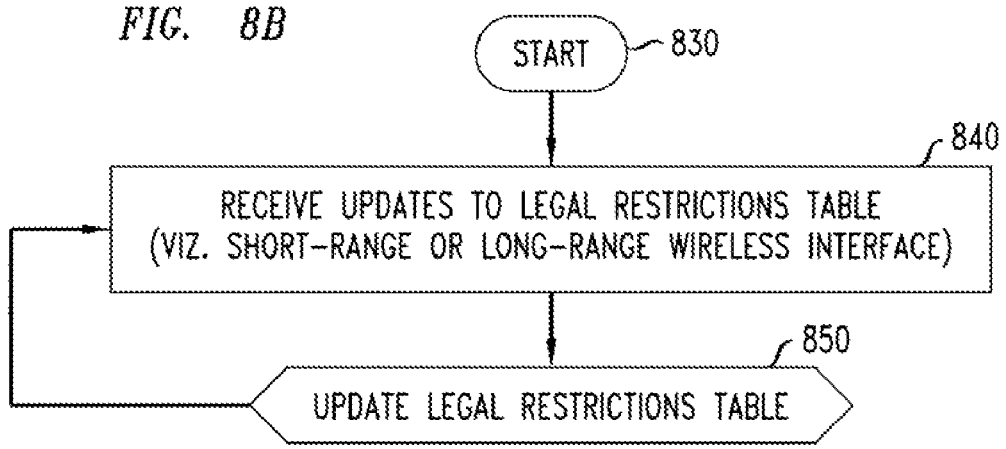
Figure 8C:
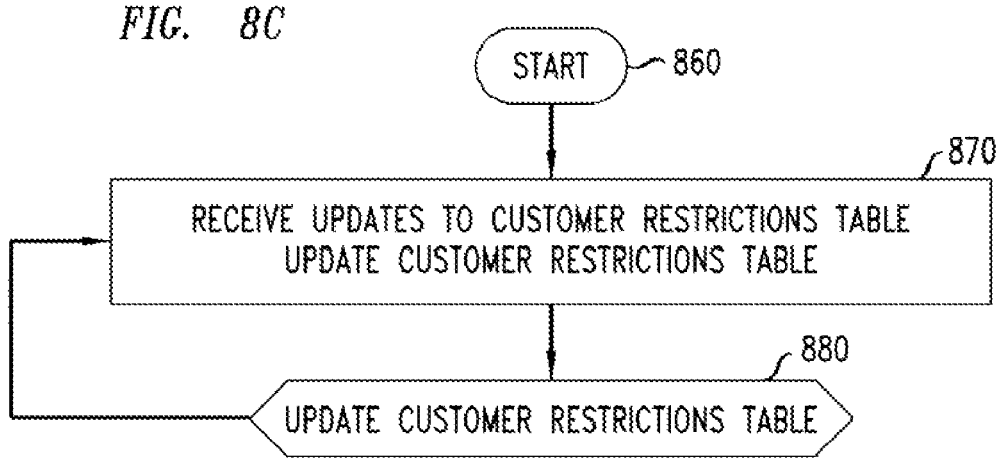

FIGS. 8A-C present flowcharts of illustrative operations at cell phones, upon powering on, or from time-to-time, associated with receipt of updates to over short-range wireless links from a source within or external to a vehicle, or over long-range wireless links (e.g., from a wireless system base station). FIG. 8A relates to regions table updates, FIG. 8B relates to legal restrictions table updates, and FIG. 8C relates to customer restrictions table updates.

FIG. 9 presents a flowchart of a routine for determining average speed as an input to be tested against legal or customer restrictions entries, e.g., entries in tables shown in FIGS. 6 and 7. Basically, position determinations are made at steps 910 and 940 using the GPS functionality at times s seconds apart and the distance between the two points is determined. Knowing this distance and the time, s, average speed is readily determined.

FIGS. 10-20 are flowcharts illustrating operations useful in determining and effecting legal and customer-imposed restrictions on cell phone use. These flowcharts are conveniently connected by exit and entry points A, B, . . . , as part of an infinite loop with multiple entry points. Further, it proves convenient for discussion of these FIGs. to define four Boolean variables corresponding to the restriction types 1-4 described above. Thus, the illustrative variables and corresponding meanings are:

Active Warning—Provide periodic warnings during an active call;

Active Disconnect—Provide a notification, then disconnect an active call;

Block Origination—Block attempts to originate calls; and

Block Call Reception—Block reception of all calls to the subject cell phone.

Figure 10:
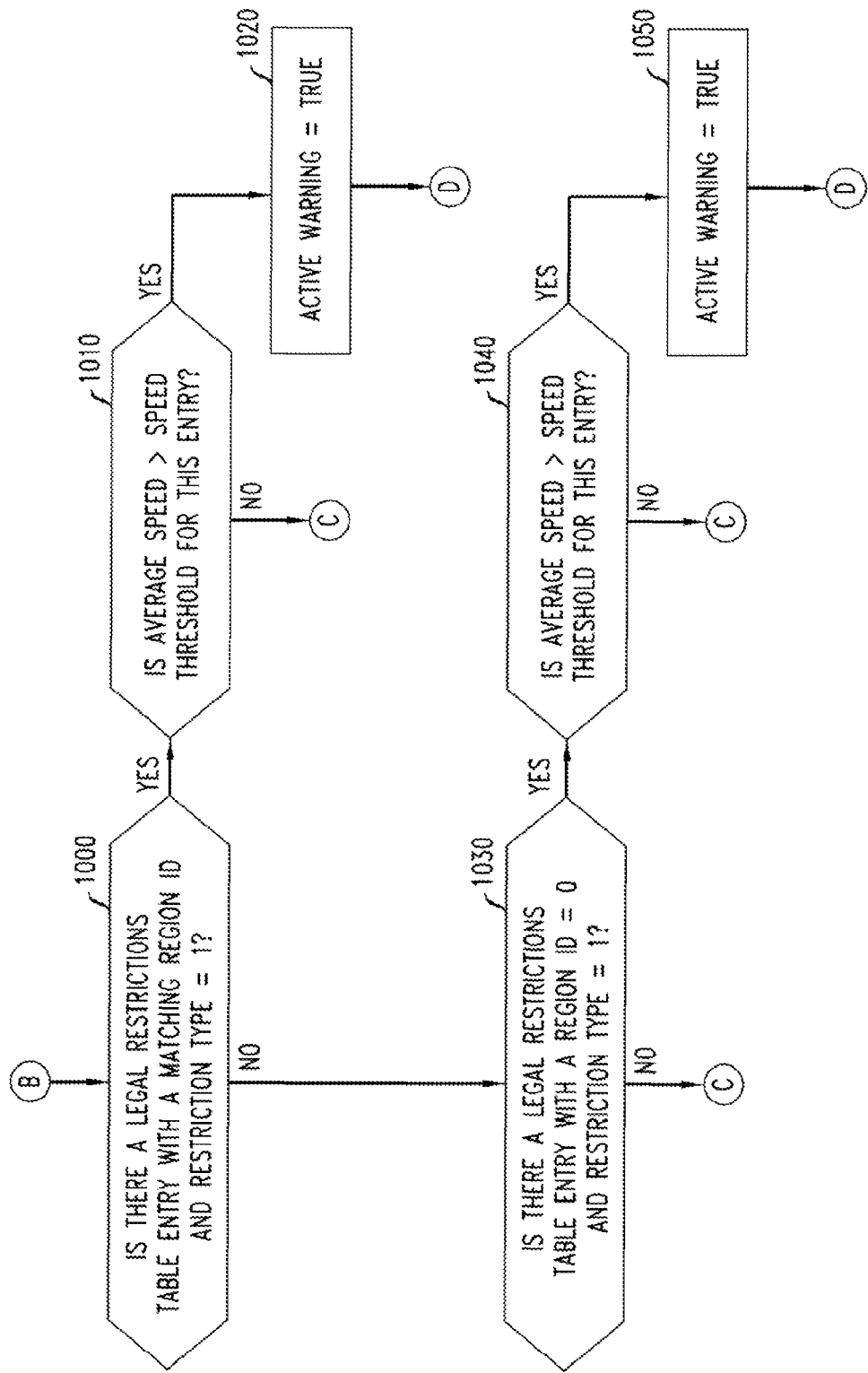
FIGS. 10-17 are flowcharts of illustrative processing for use with the illustrative routine of FIG. 9 for determining the state of variables for use in imposing restrictions on cell phone use.

In FIG. 10, as in following flowcharts, it is assumed that a determination of the region ID for the region in which the subject cell phone is located has been made. Then, in FIG. 10, a test is made at step 1000 for a legal restriction matching the region ID. If the test yields a Yes result, a further test is made at 1010 for an average speed in excess of the threshold for the current legal restriction. If the latter test yields a yes result, Active Warning is set to TRUE at 1020. If the average speed test at 1010 yields a No result, then a return is effected to entry point C.

Continuing in FIG. 10, if a legal restriction is to apply in all regions, the variable Region ID=0 for all regions. Again, restriction Type 1 is tested for at 1030, and a speed test performed at 1040. If the speed test yields a true result, then Active Warning is set to TRUE at 1050 and a return to entry D is effected; otherwise, a return to entry C is effected with Active Warning not set.

Figure 11:
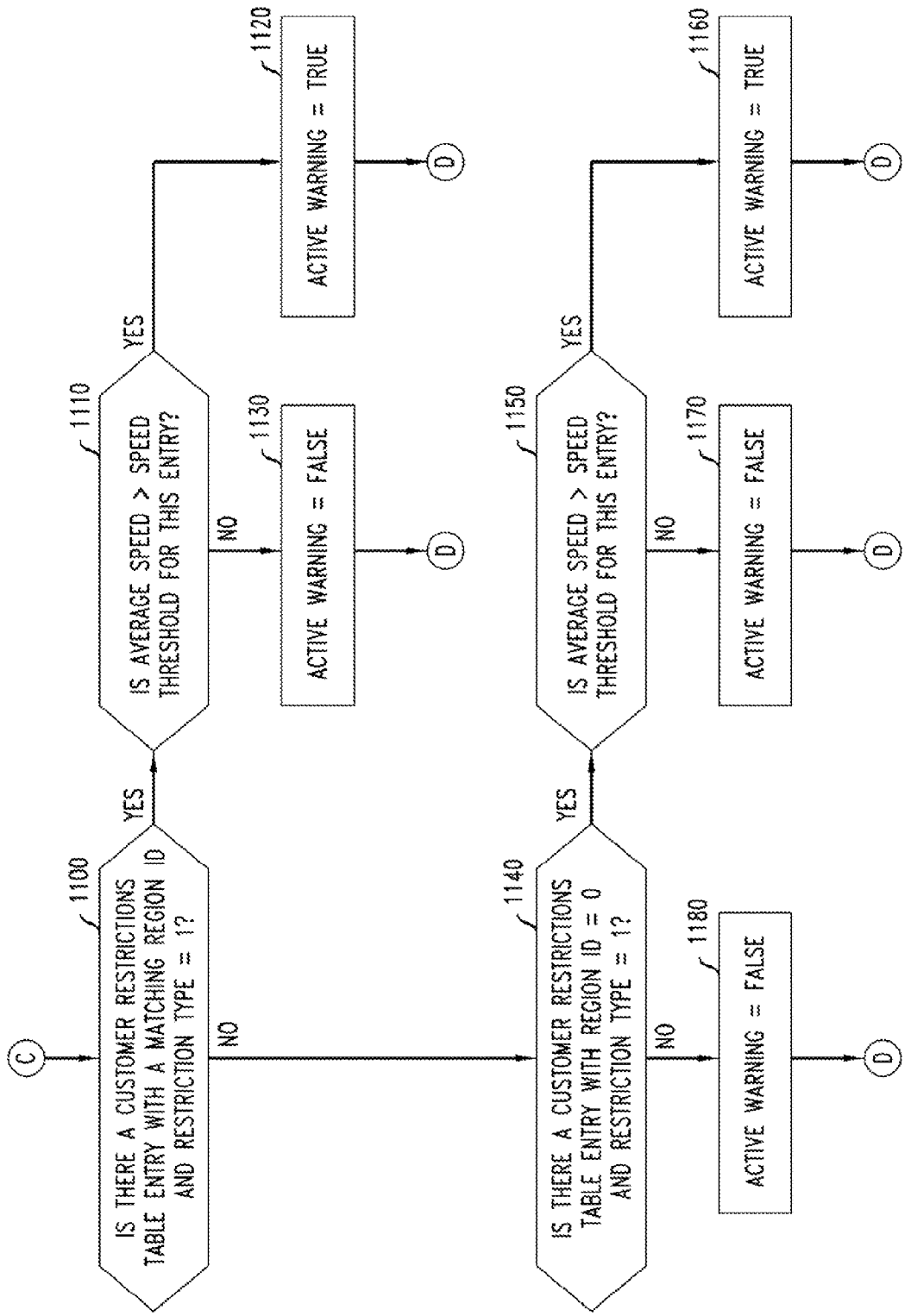

FIG. 11 illustrates the same form of testing as in FIG. 10, except entries in customer restrictions table, e.g., those in the table of FIG. 7, are used for comparison. All returns are to entry point D. Additionally, a NO result at tests 1110 and 1140 is used to explicitly set the Active Warning variable to FALSE before returning to entry D, thus inhibiting or preventing the issuance of a warning to a user.

Figure 12:
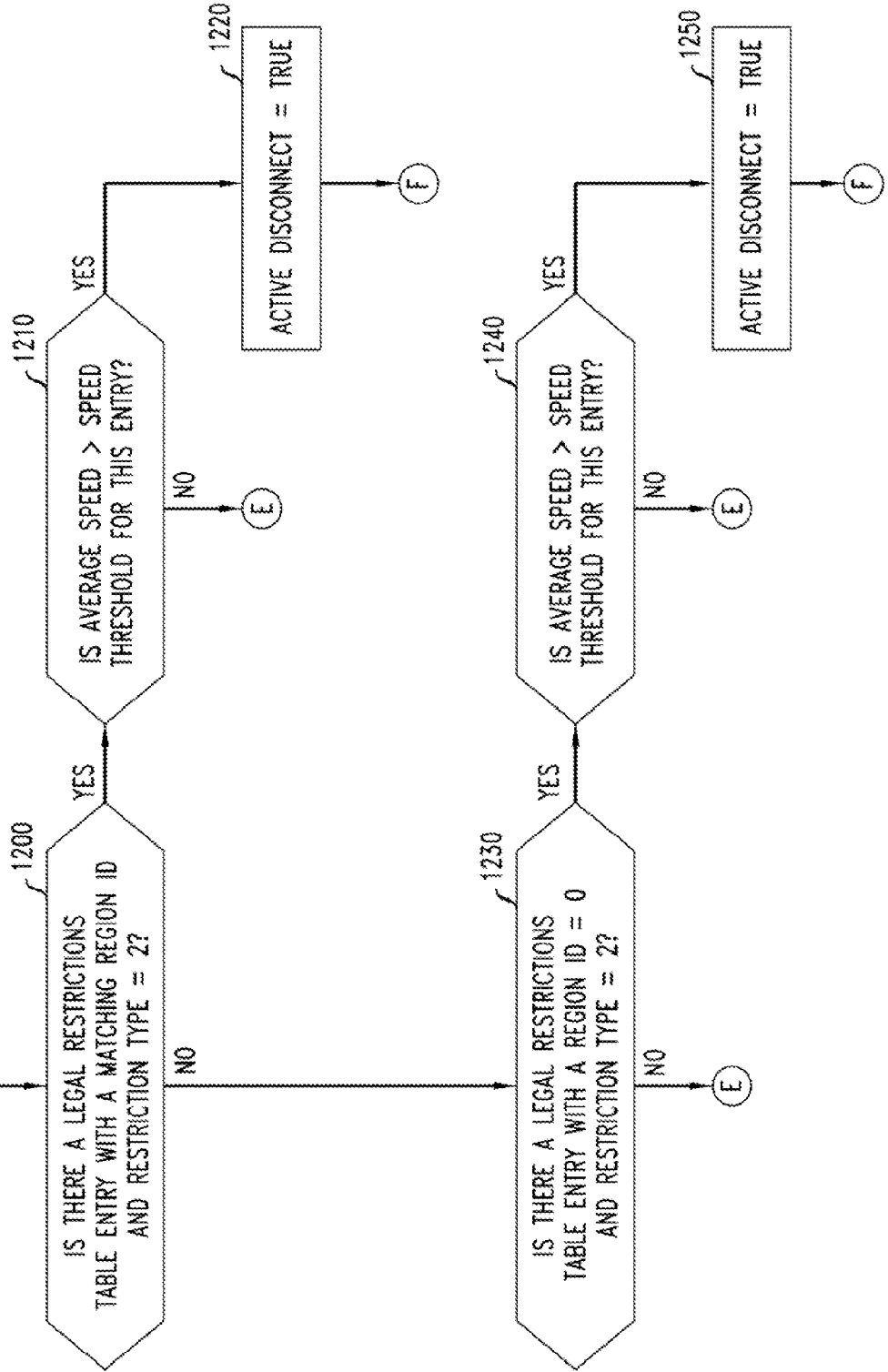

FIG. 12 shows testing for Type 2 restrictions, and setting of Active Disconnect to TRUE. Otherwise, processing shown in FIG. 12 is the same as that shown in FIG. 10, but returns are to entry points E or F, as appropriate to results shown in FIG. 12.

Figure 13:
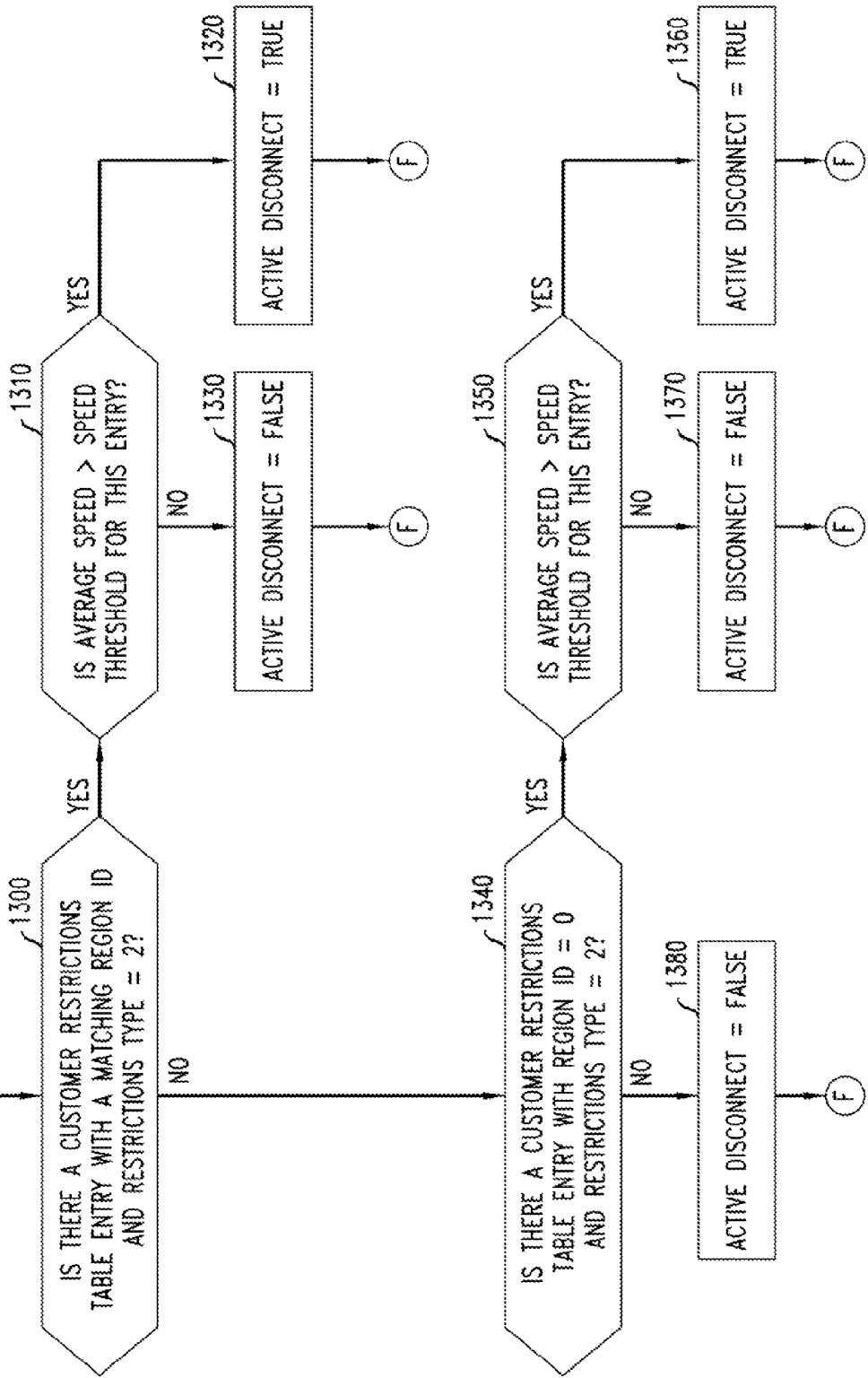

In like manner, FIG. 13 shows testing for Type 2 restrictions, and setting of Active Disconnect to TRUE or FALSE based on restrictions found in a customer restrictions table. In this respect processing shown in FIG. 13 is the same as that shown in FIG. 11, but returns are to entry point F.

Figure 14:
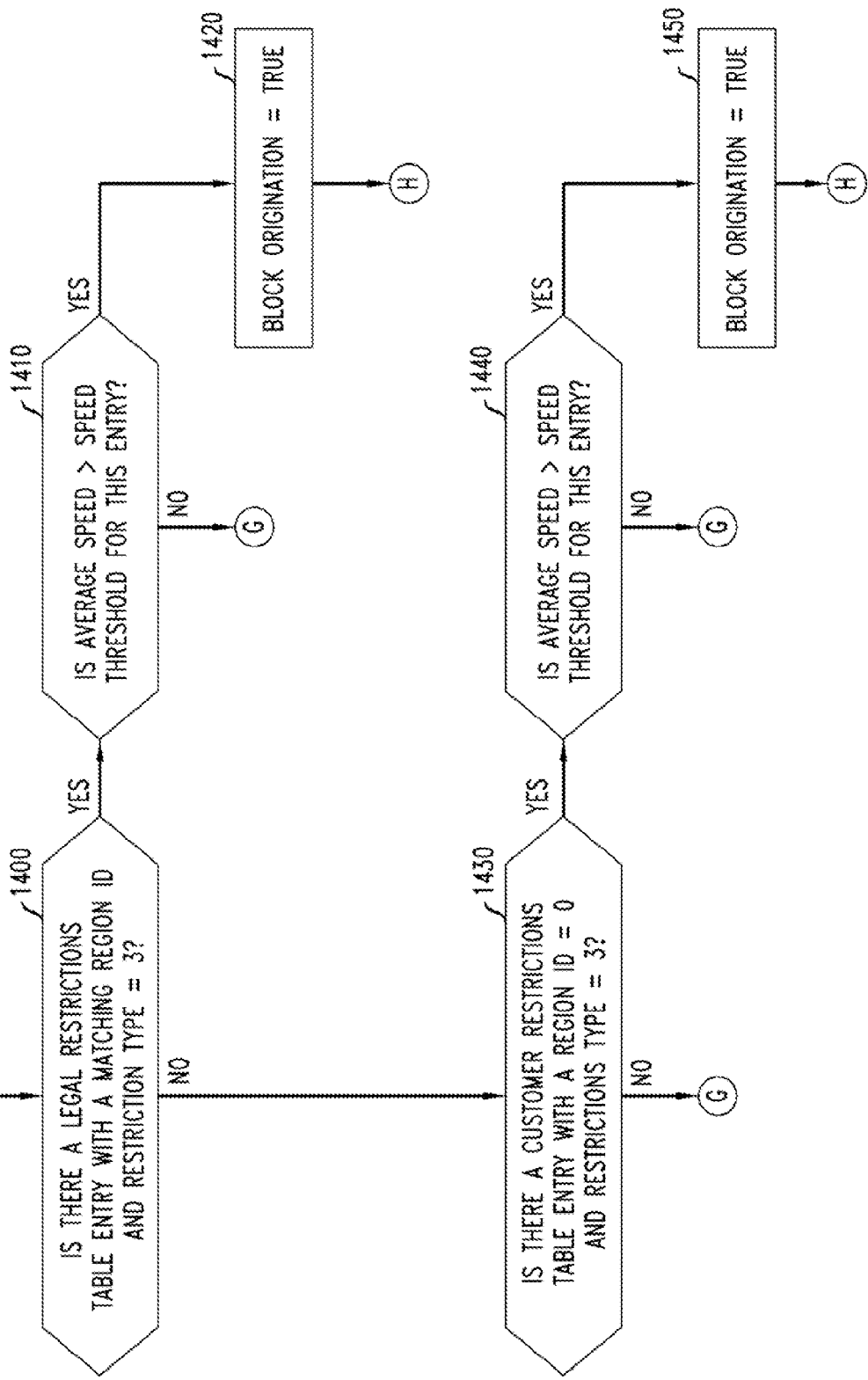
Figure 15:
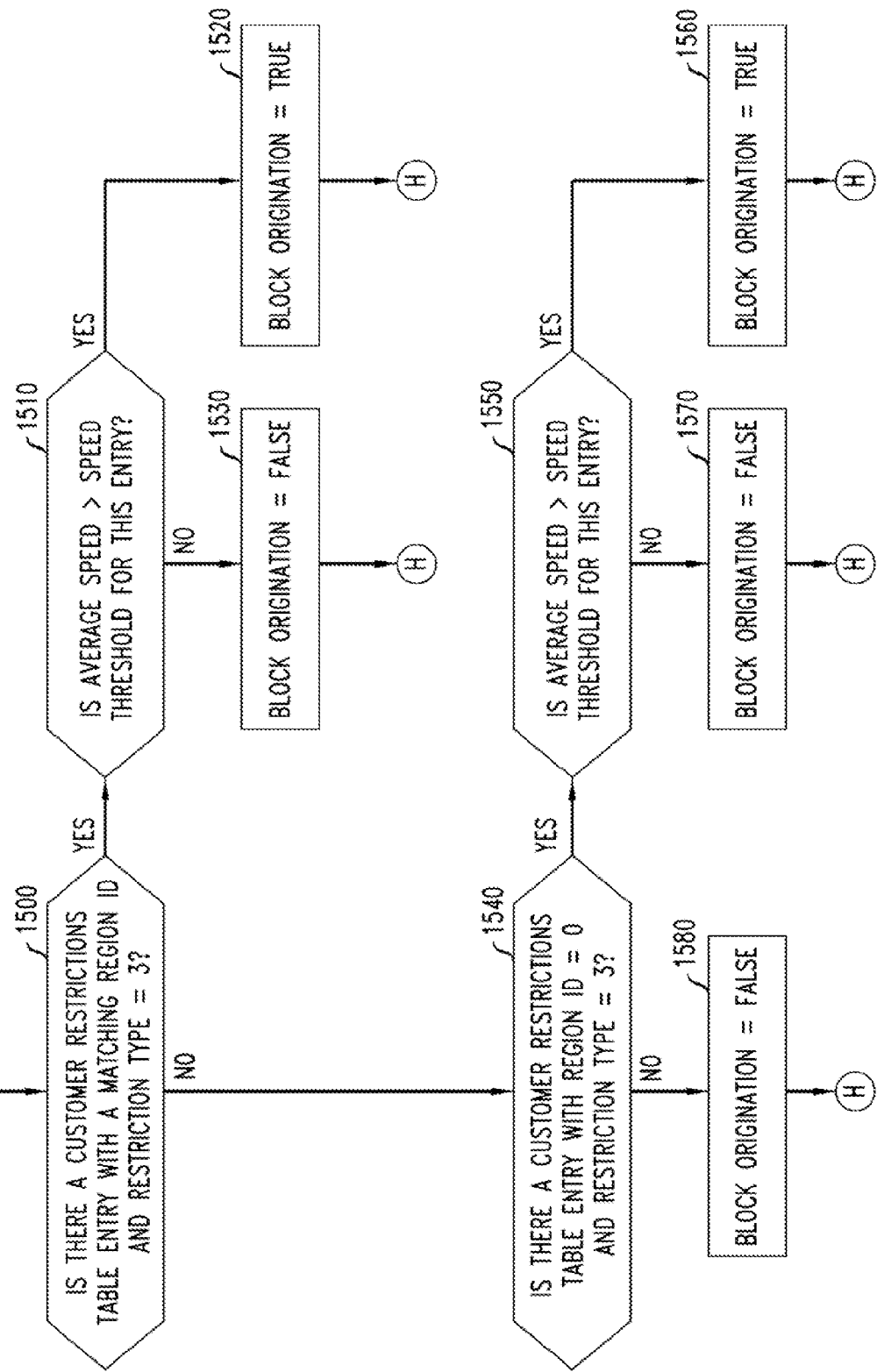
Figure 16:
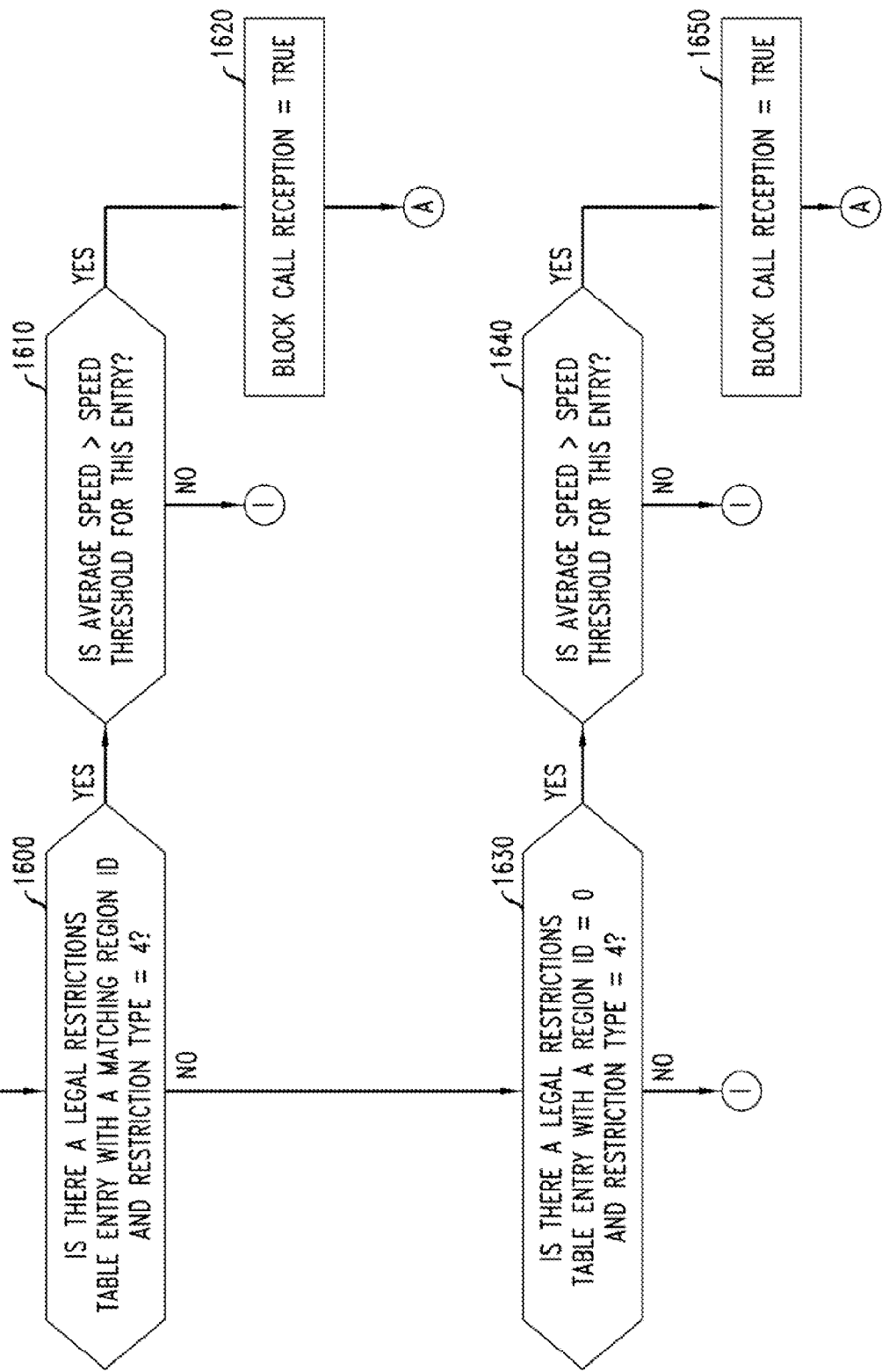

FIGS. 14 and 15 repeat the tests of FIGS. 10 and 11, respectively, in testing for restriction Type 3, and set Block Origination to TRUE when condition thresholds are exceeded. Returns are to entry points G or H (FIG. 14), or only to H (FIG. 15).

Figure 17:
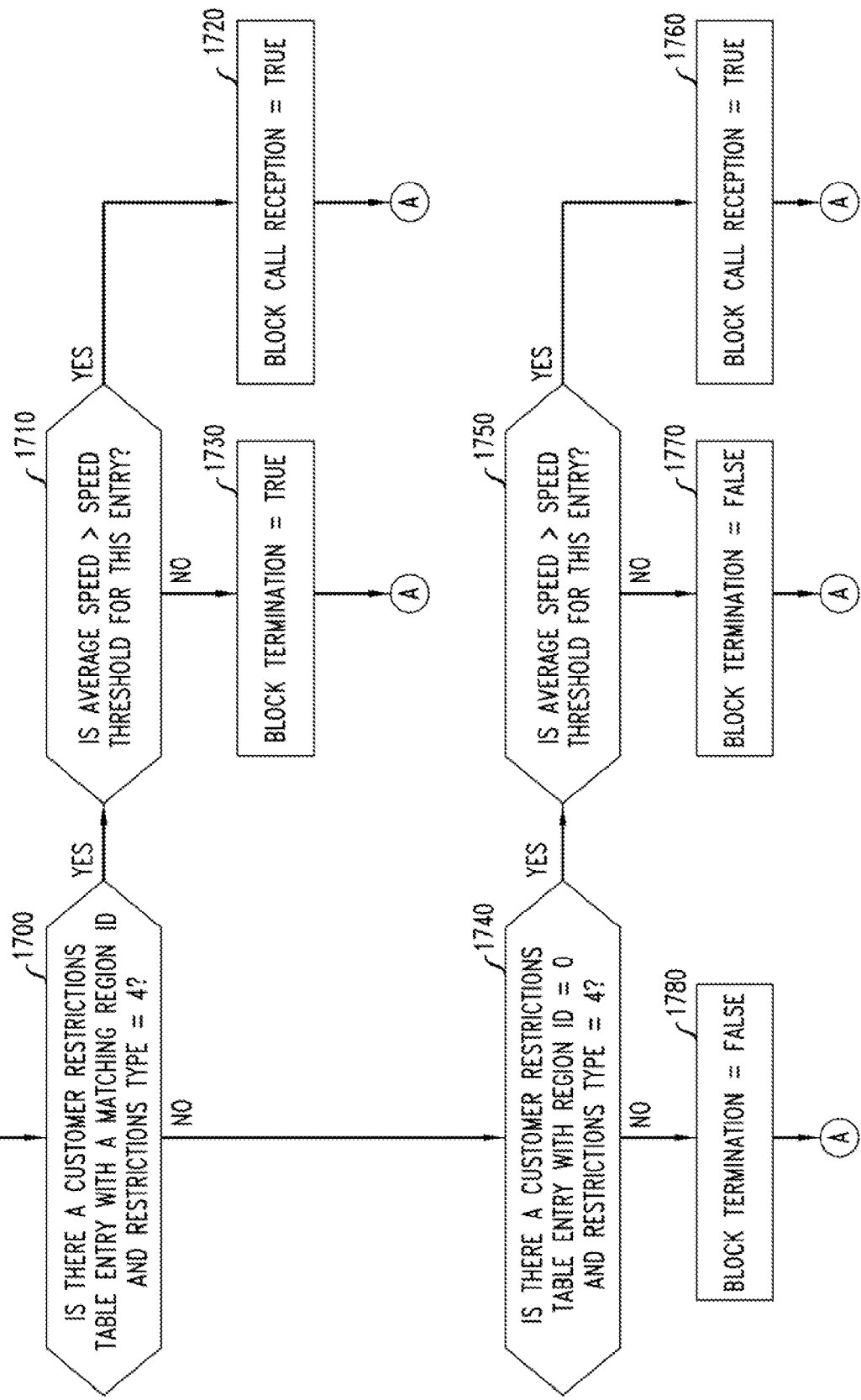

FIGS. 16 and 17 again repeat the tests of FIGS. 10 and 11, respectively, in testing for restriction Type 4, and set Block Call Reception to TRUE when condition thresholds are exceeded. Returns are to entry points I or A (FIG. 16), or only to A (FIG. 17).

Figure 18:
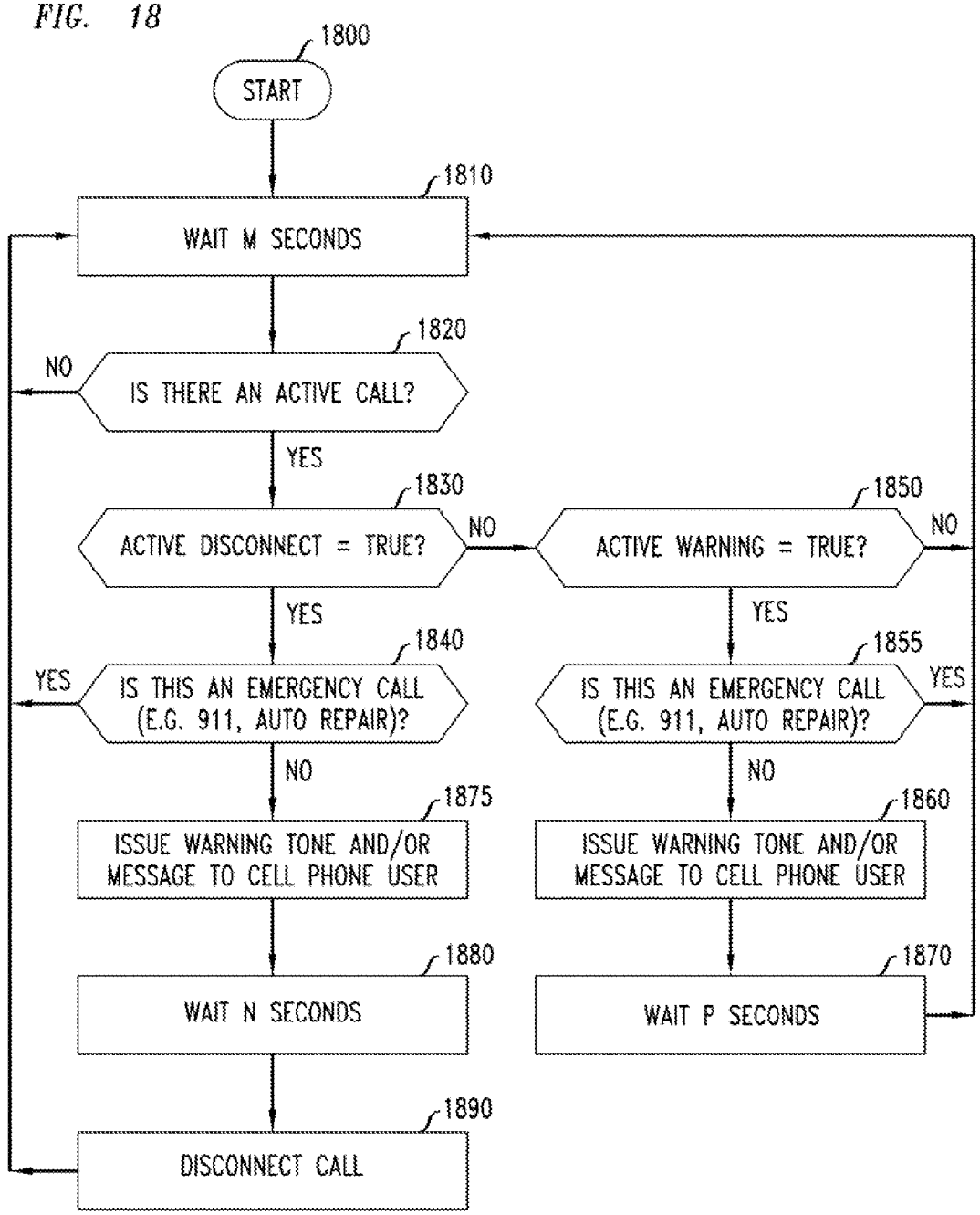
FIG. 18 is a flowchart of an illustrative routine for imposing restrictions on cell phone use based on the states of illustrative variables determined in the processing of FIGS. 10-17 and on other conditions and determinations.

FIG. 18 is a flowchart showing illustrative processing during an active call. After start (1800) a waiting period of M seconds is introduced at 1810, after which a test for an active call is made at 1820. If this test yields a NO, a return to 1810 is effected. If the test at 1820 yields a YES result a test is made at 1830 for a TRUE value for Active Disconnect. If this test yields a YES, then a further test is made at 1840 for the existence of an emergency call, such as 911. If the test at 1840 yields a YES, then a return to 1810 is effected. If the test at 1830 yields a NO, then a further test is made at 1850 for a TRUE value for Active Warning. If Active Warning is not TRUE, then processing at 1850 returns to 1810; if the test at 1850 yields a YES result, then the same kind of test made at 1840 for an emergency call is made at 1855. If the test at 1855 yields a YES result, then processing again returns to 1810, otherwise, a warning is issued at 1860 in the form of a tone or tones, or as a recorded voice announcement to the cell phone user. After a P-second delay introduced at 1870, processing is returned to 1810. The closed loop back to 1810 is then repeated.

If upon testing at 1840 a NO result is obtained, indicating that the call is not an emergency call then a warning is issued to the cell phone user and, after an N-second delay introduced at 1880, the call is disconnected at 1890. Then a return to 1810 causes renewed testing for an active call.

While the tests at 1840 and 1855 in FIG. 18 are illustratively shown as tests for 911 emergency calls, the test can be for any number of other special conditions, such as call to specified numbers for emergency auto repairs, calls by a police or other emergency worker or the like. While audio (tones or voice messages) are described as illustrative warning indications, graphical outputs through GUI 450 may as well be used (or used in addition to audio outputs) to signal a warning. Further, more than one type of warning, can be issued to indicate warnings of particular conditions.

Figure 19:
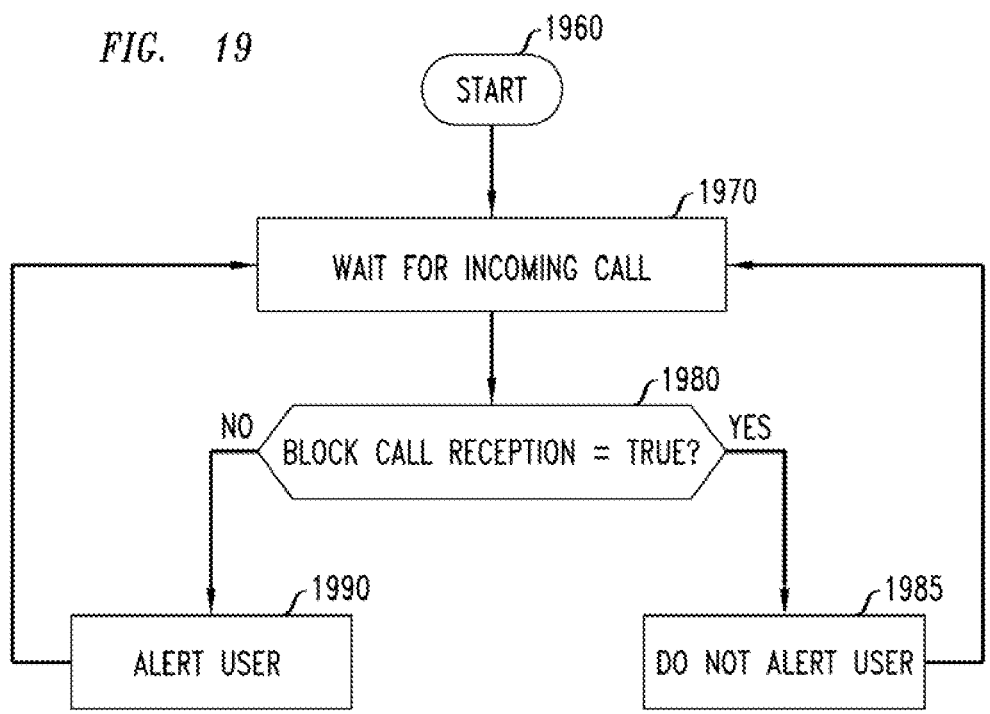
FIGS. 19 and 20 are flowcharts of other routines for imposing restrictions on cell phone use based on the states of illustrative variables determined in the processing of FIGS. 10-17 and on other conditions and determinations.

FIG. 19 is a flowchart depicting illustrative processing for an incoming wireless call. There, after starting at 1960, block 1970 indicates waiting for an incoming call. If a Block Call Reception=True condition exists, when the test at 1980 is performed, then notice of the incoming call (as by ringing, tones, etc.) is inhibited, as shown at 1985. If Block Call Reception=False, the user is alerted to the arrival of the incoming call in the usual manner, as shown at 1990.

Figure 20:
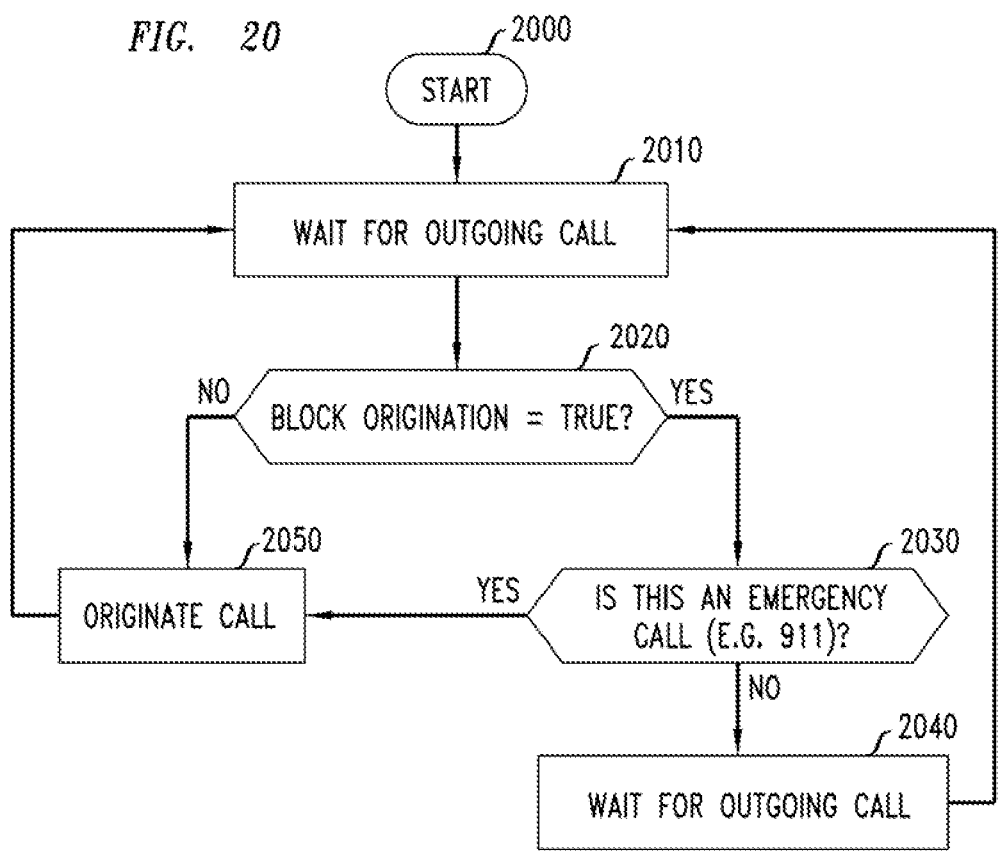

FIG. 20 is a flowchart depicting illustrative processing for an outgoing wireless calls. There, after starting at 2000, block 2010 indicates waiting (e.g., in a loop) for an outgoing call. If a Block Origination=True condition exists, when the test at 2020 is performed, then a further test for an emergency call is performed at 2030. If the call is an emergency call, then origination of the call is accomplished as shown by 2050. If the call sought to be originated is not a qualifying emergency call, then origination is not allowed, and waiting for an outgoing call is continued at 2040 and 2010. If a Block Origination=True condition is not found at 2020, then the call origination is allowed, as indicated again at 2050.

As described above in connection with FIG. 2, a Legal Restrictions Server (LRS) is conveniently employed to store information regarding definitions of geographic regions and applicable legal restriction to each of the respective regions. While shown in FIG. 2 as a single discrete server connected directly to a short-range transmitter, LRS 250 is advantageously connected as part of a network of servers. Thus, a plurality of LRS servers may serve a local area, such as a municipality, and some may be located in critical areas where legal restrictions are different from those in adjacent areas. Thus, an LRS may be located on approaches to a school zone, a portion of a highway or through road having a need for critical or variable traffic restrictions. Similarly, LRS servers will advantageously be networked to other LRS servers in a local area and in broader geographical areas to reflect emerging or wide-area needs for cell phone restrictions. It will prove convenient to provide for short- and long-term updates to LRS databases by police and/or other governmental authorities.

Figure 21:
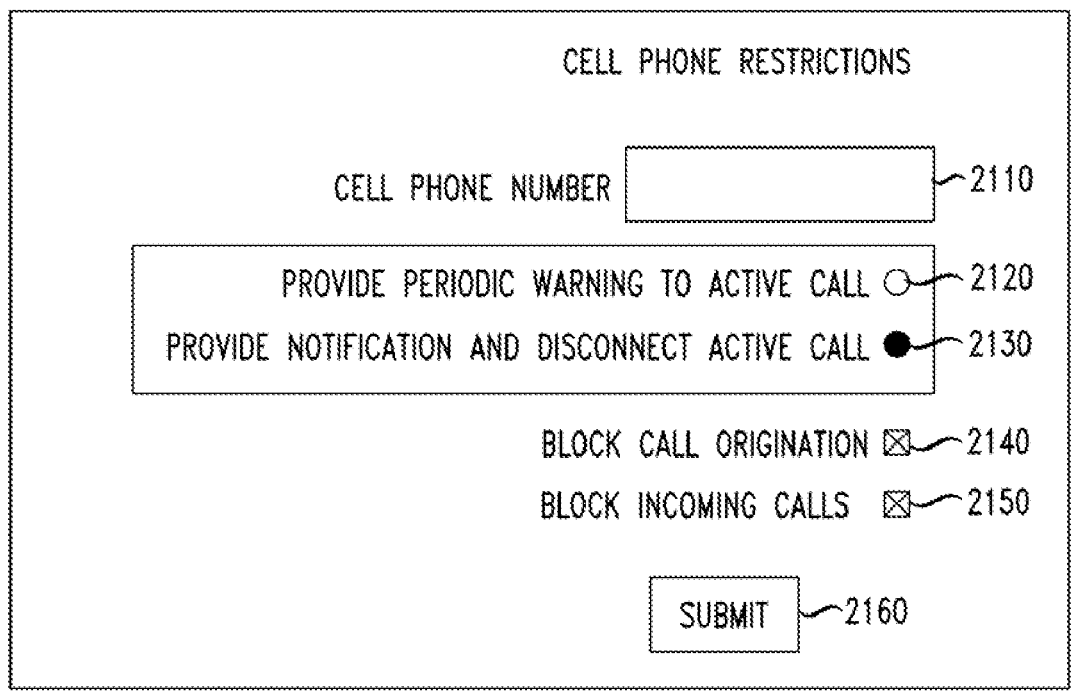
FIG. 21 is an illustrative screen for submitting customer restrictions to a customer restrictions database using a web browser interface.

Flexibility in imposing restrictions on cell phone use is also provided, in accordance with present inventive teachings, in respect of customer restrictions servers (CRSs). As described above in connection with FIG. 3, it proves convenient to provide means for introducing and updating customer restrictions through a web browser, such as 350 in FIG. 3. FIG. 2*l* shows an illustrative browser page downloaded to a customer (after normal authentication) by a CRS, such as 330 in FIG. 3. In FIG. 21, provision is made to enter the cell phone number of the subject cell phone, and selections for restrictions to be applied. Since the provision of warnings for an active call (without disconnect) and disconnecting after notification are mutually exclusive options, these are presented as customer selectable radio buttons or the like in FIG. 21. Blocking call originations and blocking incoming calls are illustratively individually selectable by a customer.

While FIG. 3 suggests access to the CRS via a separate network link, such as a personal computer hosting a web browser, it will be understood that browsers may also be installed in cell phones—with web pages displayed on graphical user interfaces, such as GUI 450 in FIG. 4. Thus a customer may choose to log in to the CRS website using a web-enabled cell phone to effect changes to CRS database entries for the calling cell phone or another cell phone owned or controlled by the customer.

Figure 22:
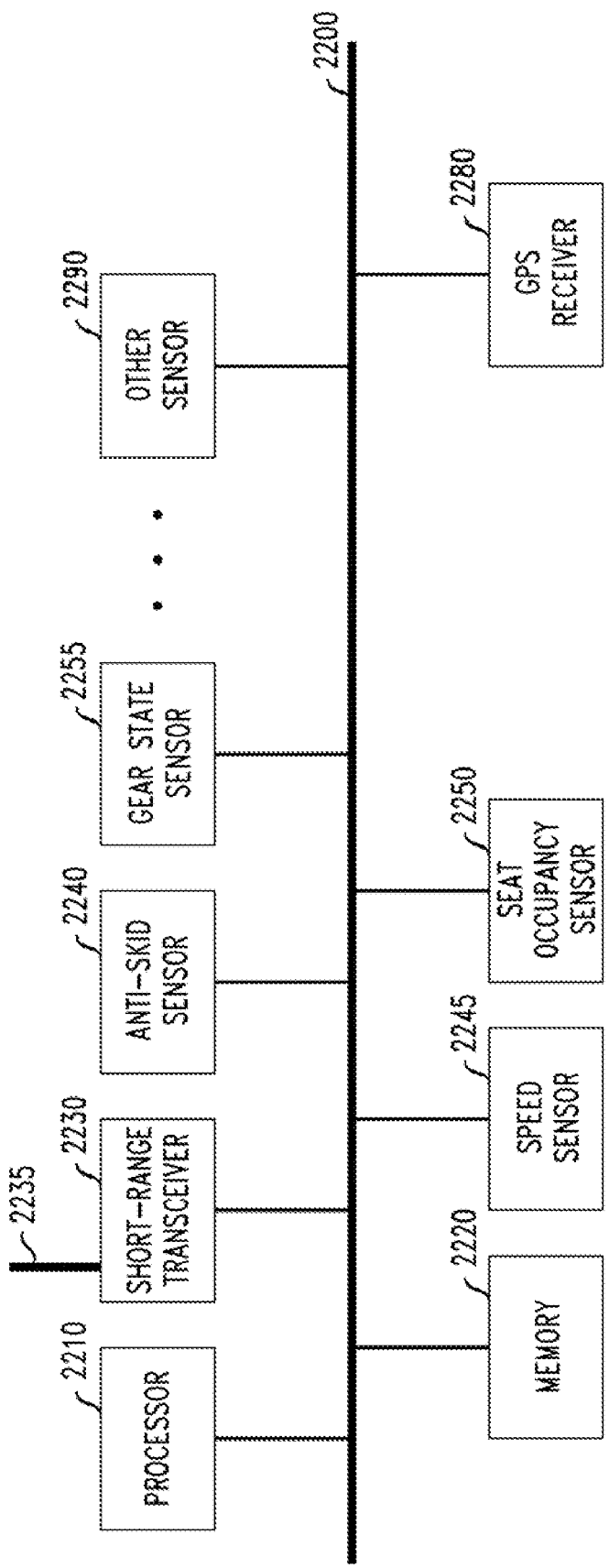
FIG. 22 is an alternative restrictions processing system for in-vehicle use that permits simplification of cell phone configurations.

While processing of inputs and storage of table or other structured information relating to cell phone restrictions has been described above as advantageously being performed in the subject cell phone itself, this is not always preferred. Thus, it proves advantageous in some embodiments of the present invention for a cell phone that is powered on while in a vehicle to exchange messages with a short-range transceiver located in the vehicle for purposes of off-loading at least some of the required processing and storage. FIG. 22 shows an arrangement including a vehicle-based transceiver for communicating with a plurality of sensors and a vehicle-borne cell phone, all elements being conveniently arranged to share a common bus 2200.

The desirability of employing vehicle-based processing in place of having all data collecting, storage, analysis and messaging relating to cell phone use restrictions present in the cell phone itself becomes evident in a number of illustrative embodiments. In a first aspect, it proves simpler to have reduced storage and processing resources on the cell phone; such simplifications reduce cost, increase reliability and permit functionality and design of cell phones to be more standardized. Moreover, vehicle-based processing, sensing, and storage addresses the problem of in-vehicle use more directly; it does not require functionality in a cell phone not always or frequently being used in a vehicle under operation.

Still further, a growing number of automobiles include GPS functionality for assisting in vehicle location, providing traveling directions, and for other purposes. Thus, some embodiments of the present invention will not require cell phones that include GPS functionality—in addition to permitting a reduction in memory and processing resources. In fact, use of other vehicle-borne processor memory for such purposes as engine monitoring, other mechanical system monitoring and warning systems, hands-free dialing of cell phones and other purposes can be shared in appropriate cases to include processing of cell phone use restrictions.

Accordingly, FIG. 22 shows a block diagram of an illustrative in-vehicle system for gathering information relating to cell phone use restrictions applicable to cell phones in a vehicle. Provision will be made in appropriate cases to provide power to the system of FIG. 22, to the extent it may require powering, whether the vehicle is operating or not. Such stationary operation of the system of FIG. 22 permits in-vehicle cell phones that are powered on to perform a registration or interactive hand-shaking sequence with the system of FIG. 22. Thus, it proves advantageous to have short-range transceiver 460 in the cell phone of FIG. 4 identify itself through short-range transceiver 2230 (shown with in-vehicle antenna 2235) to processor 2210, and to provide legal and customer restriction information of the type shown by way of illustration in FIGS. 6 and 7 and described above for storage in memory 2220.

Identification of in-vehicle cell phones will be with respect to cell phone number or other convenient identification indicia. Such identification and related legal and customer restriction information, in combination with other information available to the system of FIG. 22, enables processor 2210 to form command messages for transmission to in-vehicle cell phones to enforce appropriate warnings and/or prohibitions on originating or receiving cell phone calls. These command messages are advantageously delivered over a link from transceiver 2230 to respective ones of short-range transceivers (such as 460 in FIG. 4) in cell phones that have identified themselves to the in-vehicle system of FIG. 22 and have supplied appropriate restrictions information.

Receipt of legal and customer restrictions information is advantageously accomplished by each cell phone in a vehicle as described above over long-range links such as that to cell base stations, or over links between a short-range transmitters (such as 230 in FIG. 2) to transceivers (such as 460 in FIG. 4) in each reporting cell phone. Such restrictions information received at the cell phones is forwarded to the in-vehicle system of FIG. 22 over short range links between transceiver 2230 and short-range transceivers (such as 460) in the respective cell phones.

Processor 2210 is a general-purpose processor capable of performing selected ones of the operations performed by cell phone controller 475, in the previous descriptions of that controller. The selection of functions to be performed by processor 2210 will, of course, depend on which operations are reserved for inclusion in a reduced-complexity cell phone. Processor 2210 will generally support and supervise the various sensors and communications elements shown in FIG. 22 (and their outputs). In appropriate cases processor 2210 will supplement or replace processors typically found in one or more of the sensors 2240, 2245, 2250 and other sensors represented by block 2290.

GPS receiver 2280 advantageously derives vehicle position information through interaction with the GPS system. Vehicle-based GPS receivers are, of course, well known, and will illustratively assume the form of a NAVSYS Corporation Automatic Vehicle Locating System GPS receiver. Outputs from GPS receiver 2280 are used to determine vehicle position for comparison with region information downloaded by cell phones located in the vehicle, downloading being accomplished as described above, and delivery to the in-vehicle system of FIG. 22 being accomplished over short-range links in the same manner as for restrictions information. Efficiencies are realized in the use of an in-vehicle system in accordance with the illustrative embodiment of FIG. 22 because only one set of applicable regions information need be retained; all cell phones are obviously in or near the same regions.

Average speed determinations described above in connection with FIG. 9 may, of course, be performed as well in the system of FIG. 22, but appropriate speed determinations also are advantageously derived from a vehicle sensor 2245, using other resources available in the vehicle, such as a digital readout from the vehicle's speedometer. Such speedometers and averaging of successive speed samples over an interval are well known in the art.

As will be understood from the prior discussions, restriction conditions relating to speed thresholds are merely illustrative of the broader class of legal and customer restrictions. Speed thresholds of zero (0 km/hr), or vehicle motion of any kind, may prove appropriate as conditions associated with particular restrictions in some applications of the present inventive principles. One particular motion-related condition that proves useful in restricting use of cell phones in automobiles is the occurrence of reverse motion, i.e., backing-up of an auto, as when parallel parking or when leaving a parking slot in a parking lot.

In fact, it will prove convenient in some cases to place restrictions on cell phone use when an automobile has its reverse gear engaged. In other cases, restrictions will apply when any gear state other than Neutral or Park is extant. Gear status readouts from automobile transmissions are described, for example, in U.S. Pat. No. 6,018,294 issued Jan. 25, 2000 to Vogel, et al.

Those skilled in the art will choose from among the illustrative conditions (and other conditions appropriate for effecting particular legal restrictions) along with vehicle location (region). In some cases, location will become irrelevant to a determination of restrictions to be imposed—as when an exceptionally high vehicle speed is detected, a condition warranting cell phone use restriction in any region. Other restrictions will be provided over short-range or long-range wireless links to a vehicle when unusual circumstances are reported. Thus, if a portion of a road or bridge is determined by traffic authorities to be dangerous due, for example, to a prior accident or icy conditions, then a region will advantageously be defined where cell phone use restrictions are imposed to encourage a higher degree of attention to driving. As with other legal restrictions, these conditions are advantageously downloaded over short-range link 405 or long-range link 410 during active calling or power-on conditions. When in-vehicle systems like those shown in FIG. 22 are used, such ad hoc restriction conditions are conveniently passed to the system using short-range links, as for normal restriction information.

Automobile anti-skid devices can also be used to indicate conditions that may warrant restrictions on cell phone use when none would otherwise apply. Thus, for example, if an anti-skid device in a vehicle (illustratively represented by Anti-Skid sensor 2240 in FIG. 22) reports a predetermined number of skid incidents over a predetermined period of time, then that device advantageously indicates the need for heightened attention to driving conditions necessitating a termination (with or without warning) of any ongoing call, and blocks future call originations for a predetermined time, or until the anti-skid device reports changed circumstances. In operation, each such skid operation will be reported to processor 2210, which will accumulate such reports and test for the number of such incidents in a predetermined time interval, or for the severity (e.g., the duration of any such incident) and issue a command to the cell phone to appropriately restrict cell phone usage.

Though many other sensors may be used to supply information for testing by processor 2210, a seat occupancy sensor may prove especially useful in modifying cell phone use restrictions. Thus sensors associated with each seat position in a vehicle are used to determine which seats are occupied. Some sensors are weight-threshold-sensitive so that a seat occupied by a small child are separately indicated from those occupied by adults or older children. In any event, when a cell phone is used in a vehicle in which only the driver's seat is occupied, then it may be assumed that the driver is the person using the cell phone. In that event, restrictions are imposed in the normal course, depending on location, legal and customer restrictions and any other available relevant information, e.g., skidding. If, on the other hand, more than one adult person is found to be seated, a modified application of the cell phone use restrictions may be imposed. To further refine the identification of the user of an active cell phone it will prove useful in some cases to employ a plurality of antennas at short-range transceiver 2230 to locate the source of signals from individual cell phones powered on in the vehicle.

Another useful technique for identifying the location within a vehicle from which particular attempts at cell phone use are attempted employs the coupling of infra-red sensors with short-range radio links (e.g., Bluetooth technology). In particular, one or more directional infra-red sensors are arranged to receive infra-red signals from infra-red transmitters or transceivers built into cell phones in the vehicle. The Bluetooth standard includes specifications and a Bluetooth profile (illustratively, the so-called Generic Object Exchange Profile, or GOEP) for interfacing well-known IrDA infra-red devices with Bluetooth devices. See, for example, the Miller, et al book, supra at pp. 243-245. By combining signals from one or more infra-red signal transmitters in cell phones at a plurality of IrDA receivers (advantageously combined with any directional information available from Bluetooth or similar radio receivers in the vehicle), more certain location of a cell phone user is derived.

Further off-loading of computational and memory requirements may be effected by providing location information from a vehicle to a base station, such as 125 in FIG. 1, which is in possession of legal and/or customer restrictions (and any appropriate external condition information such as weather or traffic accident information) from network databases. Network processor(s) then determines appropriate restrictions to be imposed on particular cell phones and sends message commands to respective ones of powered-on cell phones. Alternatively, restrictions derived by network processors can be imposed (with or without warnings) at the base station end of a link to the cell phone.

While the foregoing descriptions of determining and imposing restrictions on cell phone use have proceeded in terms of now traditional cell phones structures and protocols, including TDMA, CDMA, GSM, IS-136, Personal Digital Cellular (PDC) and PCS and other well-known schemes, it should be understood that present inventive principles are applicable to a wide range of mobile communications, computing, digital assistant and entertainment devices and systems.

Further, not all devices subject to control using present inventive teachings need be primarily communications devices. Controls on use of portable devices using present inventive teachings will be effected in some cases though simple communications features and facilities in the controlled portable devices after determinations of location and related restrictions information external to the controlled devices.

Moreover, such inventive principles and techniques are applicable to such devices and systems using emerging and future communications structures, techniques and protocols. Thus, for example, so-called Third-Generation Wireless systems and techniques are readily adapted to include functionality and methodologies described in illustrative embodiments above. Such Third Generation Wireless are described, for example, in "The Complete Solution for Third-Generation Wireless Communications: Two Modes on Air, One Winning Strategy," IEEE Personal Communications, December 2000, pp. 18-24 and references cited therein. Use of Location Management techniques useful in applying present inventive techniques in next generation wireless communications systems is discussed in V. W-S. Wong, et al, "Location Management for Next-Generation Personal Communications Networks," IEEE Network, September/October 2000, pp. 18-24.

What is claimed is:

1. A method for controlling the use of a personal communications device comprising
    deriving information relating to the geographic location of the personal communications device,
    in a processor of the personal communications device, accessing region information in a region table stored at the personal communications device and containing restrictions on use of the personal communications device in each of a plurality of geographic regions likely to be of interest,
    determining whether the geographic location of the personal communications device bears a predetermined relationship to at least one of the geographic regions of the stored region information, and
    in a processor of the personal communications device, enforcing the restrictions on the use of the personal communications device while the predetermined relationship exists, by supervision of communication elements within the communications device.

2. The method of claim 1 wherein the deriving information relating to the geographic location of the personal communications device comprises deriving information from a global positioning system receiver.

3. The method of claim 2 wherein the global positioning system receiver is included in the personal communications device.

4. The method of claim 2 wherein the global positioning system receiver is installed in a vehicle.

5. The method of claim 1, further comprising:
storing region information in the region table upon power-up of the personal communications device.

6. The method of claim 1, further comprising:
storing region information in the region table upon the personal communications device passing between wireless cells.

7. The method of claim 6 wherein storing region information further comprises overwriting at least some previously stored region information.

8. The method of claim 1 wherein the region information includes boundary definitions for at least one of the plurality of geographic regions.

9. The method of claim 1 wherein the region information includes legal restrictions imposed by a governmental authority on personal communications device use particular to at least one of the plurality of geographic regions.

10. The method of claim 1 wherein the use of a personal communications device is pursuant to an arrangement with a communications carrier, and the region information includes restrictions imposed by a customer of the carrier.

11. A personal communications device, comprising:
means for deriving information relating to the geographic location of the personal communications device;
a computer storage device containing a region table including restrictions on use of the personal communications device in each of a plurality of geographic regions likely to be of interest;
a processor of the personal communications device configured to:
access region information in the region table;
determine whether the geographic location of the personal communications device bears a predetermined relationship to at least one of the geographic regions of the stored region information; and
enforce the restrictions on the use of the personal communications device while the predetermined relationship exists, by supervision of communication elements within the communications device.

12. The personal communication device of claim 11 wherein the means for deriving information relating to the geographic location of the personal communications device comprises means for deriving information from a global positioning system, receiver.

13. The personal communication device of claim 12 wherein the global positioning system receiver is included in the personal communications device.

14. The personal communication device of claim 12 wherein the global positioning system receiver is installed in a vehicle.

15. The personal communication device of claim 11, further comprising:
means for storing region information in the region table upon power-up of the personal communications device.

16. The personal communication device of claim 11, further comprising:
means for storing region information in the region table upon the personal communications device passing between wireless cells.

17. The personal communication device of claim 16, wherein the means for storing region information further comprises means for overwriting at least some previously stored region information.

18. The personal communication device of claim 11, wherein the region information includes boundary definitions for at least one of the plurality of geographic regions.

19. The personal communication device of claim 11, wherein the region information includes legal restrictions imposed by a governmental authority on personal communications device use particular to at least one of the plurality of geographic regions.

20. The personal communication device of claim 11 wherein use of the personal communications device is pursuant to an arrangement with a communications carrier, and the region information includes restrictions imposed by a customer of the carrier.

\* \* \* \* \*